(12) United States Patent
Eissler et al.

(10) Patent No.: US 11,482,698 B2
(45) Date of Patent: Oct. 25, 2022

(54) IMMOBILIZED SELENIUM, A METHOD OF MAKING, AND USES OF IMMOBILIZED SELENIUM IN A RECHARGEABLE BATTERY

(71) Applicant: II-VI Delaware, Inc, Wilmington, DE (US)

(72) Inventors: Elgin E. Eissler, Renfrew, PA (US); Wen-Qing Xu, Medfield, MA (US); Xiaoming Li, Allison Park, PA (US); Yancheng Zhang, State College, PA (US); Shailesh Patkar, Irwin, PA (US); Giovanni Barbarossa, Saratoga, CA (US); Yu-Guo Guo, Beijing (CN); Shuaifeng Zhang, Beijing (CN); Yaxia Yin, Beijing (CN)

(73) Assignees: II-VI DELAWARE, INC., Wilmington, DE (US); INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/170,747

(22) Filed: Oct. 25, 2018

(65) Prior Publication Data

US 2019/0058187 A1 Feb. 21, 2019

Related U.S. Application Data

(60) Division of application No. 15/434,655, filed on Feb. 16, 2017, now Pat. No. 10,734,638, which is a
(Continued)

(30) Foreign Application Priority Data

Sep. 22, 2015 (CN) .......................... 201510608018.4

(51) Int. Cl.
*H01M 4/136* (2010.01)
*H01M 4/36* (2006.01)
(Continued)

(52) U.S. Cl.
CPC ......... *H01M 4/1393* (2013.01); *H01M 4/133* (2013.01); *H01M 4/134* (2013.01);
(Continued)

(58) Field of Classification Search
CPC ... H01M 10/0525; H01M 4/366; H01M 4/136
See application file for complete search history.

(56) References Cited

U.S. PATENT DOCUMENTS 2,428,055 A 9/1947 Von Hippel et al.
4,164,608 A * 8/1979 Coetzer ............... H01M 2/1646
429/112

(Continued)

FOREIGN PATENT DOCUMENTS

CN 101740231 A 6/2010
CN 102078816 A 6/2011
(Continued)

OTHER PUBLICATIONS

Park, Principles and Applications of Lithium Secondary Batteries, 2010, pp. 118-119, Hongreung Science Publishing Company; (Korean original and English translation).
(Continued)

*Primary Examiner* — Jonathan G Jelsma
(74) *Attorney, Agent, or Firm* — Blank Rome LLP

(57) ABSTRACT

An immobilized selenium body, made from carbon and selenium and optionally sulfur, makes selenium more stable, requiring a higher temperature or an increase in kinetic energy for selenium to escape from the immobilized selenium body and enter a gas system, as compared to selenium alone. Immobilized selenium localized in a carbon skeleton
(Continued)

can be utilized in a rechargeable battery. Immobilization of the selenium can impart compression stress on both the carbon skeleton and the selenium. Such compression stress enhances the electrical conductivity in the carbon skeleton and among the selenium particles and creates an interface for electrons to be delivered and or harvested in use of the battery. A rechargeable battery made from immobilized selenium can be charged or discharged at a faster rate over conventional batteries and can demonstrate excellent cycling stability.

5 Claims, 23 Drawing Sheets

Related U.S. Application Data continuation-in-part of application No. 15/262,407, filed on Sep. 12, 2016, now Pat. No. 10,340,507.

(60) Provisional application No. 62/367,314, filed on Jul. 27, 2016, provisional application No. 62/364,113, filed on Jul. 19, 2016, provisional application No. 62/296,286, filed on Feb. 17, 2016.

(51) Int. Cl.
| | |
|---|---|
| H01M 10/0525 | (2010.01) |
| H01M 4/1393 | (2010.01) |
| H01M 4/133 | (2010.01) |
| H01M 4/38 | (2006.01) |
| H01M 4/583 | (2010.01) |
| H01M 4/134 | (2010.01) |
| H01M 4/1395 | (2010.01) |
| H01M 4/62 | (2006.01) |
| H01M 4/1397 | (2010.01) |
| H01M 4/58 | (2010.01) |
| H01M 50/446 | (2021.01) |
| H01M 4/02 | (2006.01) |
| H01M 10/052 | (2010.01) |
| H01M 50/411 | (2021.01) |

(52) U.S. Cl.
CPC ......... *H01M 4/136* (2013.01); *H01M 4/1395* (2013.01); *H01M 4/1397* (2013.01); *H01M 4/362* (2013.01); *H01M 4/364* (2013.01); *H01M 4/38* (2013.01); *H01M 4/58* (2013.01); *H01M 4/581* (2013.01); *H01M 4/583* (2013.01); *H01M 4/625* (2013.01); *H01M 10/0525* (2013.01); *H01M 50/446* (2021.01); *H01M 10/052* (2013.01); *H01M 50/411* (2021.01); *H01M 2004/028* (2013.01)

(56) References Cited

U.S. PATENT DOCUMENTS

| | | | |
|---|---|---|---|
| 2011/0027652 A1* | 2/2011 | Morigaki | H01M 4/505 |
| | | | 429/224 |
| 2011/0223487 A1 | 9/2011 | Johnson et al. | |
| 2012/0225352 A1 | 9/2012 | Abouimrane et al. | |
| 2015/0064575 A1 | 3/2015 | He et al. | |
| 2015/0295244 A1* | 10/2015 | Otsuka | H01G 11/48 |
| | | | 429/213 |
| 2016/0006084 A1* | 1/2016 | Kabacik | H02J 7/007 |
| | | | 320/132 |
| 2016/0020491 A1 | 1/2016 | Dai et al. | |
| 2018/0090751 A1* | 3/2018 | Xu | H01M 4/139 |

FOREIGN PATENT DOCUMENTS

| | | |
|---|---|---|
| CN | 103178246 A | 6/2013 |
| CN | 103187559 A | 7/2013 |
| CN | 103332688 A | 10/2013 |
| CN | 104201349 A | 12/2014 |
| CN | 104201389 A | 12/2014 |
| CN | 104393304 A | 3/2015 |
| CN | 104617299 A | 5/2015 |
| CN | 104733677 A | 6/2015 |
| JP | 2011509509 A | 3/2011 |
| JP | 2013225496 A | 10/2013 |

OTHER PUBLICATIONS

C. Zhao et al: "Facile synthesis of selenium/potassium tratrate derived porous carbon composite as an advanced Li-Se battery cathode—RSC Advances (RSC Publishing)", RSC Advances, 15 pages.
Luo et al., "Selenium@mesoporous Carbon Composite with Superior Lithium and Sodium Storage Capacity", ACSNANO, 2013, pp. 8003-8010, vol. 7, No. 9.
Han et al., "A Free-Standing and Ultralong-life Lithium-Selenium Battery Cathode Enabled by 3D Mesoporous Carbon Graphene Hierachical Architecture", Adv. Funct. Mater., 2015, pp. 455-463, vol. 25.
Lee et al., "Micro- and Mesoporous Carbide-Derived Carbon-Selenium Cathodes for High-Performance Lithium Selenium Batteries", Adv. Energy Mater., 2014, pp. 1-7.
Wu et al., "High-Performance Lithium Selenium Battery with Se/Microporous Carbon Composite Cathode and Carbonate-Based Electrolyte", Science China Materials, 2015, pp. 91-97, vol. 58.
Ye et al., "Advanced Se-C Nanocomposites: a Bifunctional Electrode Material for both Li-Se and Li-ion Batteries", J. Mater. Chem. A., 2014, pp. 1-6.
Wu et al., "Lithium Iodide as a Promising Electrolyte Additive for Lithium-Sulfur Batteries: Mechanisms of Performance Enhancement", Adv Mater, 2015, pp. 101-108, vol. 27.
Liu et al., "A Se/C Composite as Cathode Material for Rechargeable Lithium Batteries with Good Electrochemical Performance", RSC Advances, 2014, pp. 9086-9091, vol. 4.
Yang et al., "Elemental Selenium for Electrochemical Energy Storage", J. Phys. Chem. Lett., 2015, pp. 256-266, vol. 6.
Abouimrane et al., "A New Class of Lithium and Sodium Rechargeable Batteries Based on Selenium and Selenium-Sulfur as a Positive Electrode", Journal of American Chemical Society, 2012, pp. 4505-4508, vol. 134.
Chen et al., "Graphene-Based Three-Dimensional Hierarchical Sandwich-type Architecture for High-Performance Li/S Batteries", American Chemical Society, 2013, pp. 4642-4649, vol. 13.
Jiang et al., "Selenium encapsulated into 3D interconnected hierarchical porous carbon aerogels for lithium-selenium batteries with high rate performance and cycling stability", Journal of Power Sources, 2014, pp. 394-404, vol. 267.
Li et al., "A New Salt-Baked Approach for Confining Selenium in Metal Complex-Derived Porous Carbon with Superior Lithium Storage Properties", Advanced Functional Materials, 2015, pp. 5229-5238, vol. 25.
Li et al., "MOF-derived, N-doped, hierarchically porous carbon sponges as immobilizers to confine selenium as cathodes for Li-Se batteries with superior storage capacity and perfect cycling stability", Nanoscale, 2015, pp. 9597-9606, vol. 7.
Liu et al., "Enhanced electrochemical performances of mesoporous carbon microsphere/selenium composites by controlling the pore structure and nitrogen doping", Electrochimica Acta, 2015, pp. 140-148, vol. 153.
Sevilla et al., "A general and facile synthesis strategy towards highly porous carbons: carbonization of organic salts", Journal of Materials Chemistry A, 2013, pp. 13738-13741, vol. 1.

* cited by examiner

IMMOBILIZED SELENIUM, A METHOD OF MAKING, AND USES OF IMMOBILIZED SELENIUM IN A RECHARGEABLE BATTERY

CROSS-REFERENCE TO RELATED APPLICATIONS

This application is a division of U.S. patent application Ser. No. 15/434,655 filed Feb. 16, 2017, which is a continuation-in-part of U.S. patent application Ser. No. 15/262,407 filed Sep. 12, 201.6, which claims the benefit of Chinese patent application no. 201510608018.4, filed Sep. 22, 2015, the disclosure of each of which is incorporated. herein by reference in its entirety. This application also claims the benefit of US Provisional Application Nos. 62/367,314, filed Jul. 27, 2016; 62/364,113, filed Jul. 19, 2016; and 62/296, 286, filed Feb. 17, 2016, the disclosure of each of which is also incorporated herein by reference in its entirety.

BACKGROUND OF THE INVENTION

Field of the Invention

The present application relates to the field of lithium secondary batteries of high energy density. More particularly, the application relates to a method of preparing carbon-selenium nanocomposite materials and their applications. The present invention also relates to immobilized selenium comprising selenium and carbon. It also relates to a method of making and the utility of the immobilized selenium. One of the uses of the immobilized selenium is in a rechargeable battery. The present invention also relates to a rechargeable battery that can perform discharge-charge cycling at a fast rate (e.g., 10C-rate) with a minimum level of capacity fading while being able to substantially recover its electrochemical performance, such as specific capacity, when charged at a low rate such as at 0.1C-rate.

Description of Related Art

With the increasing human demand for energy, secondary batteries with high mass specific energy and high volumetric energy density, such as lithium-sulfur batteries and lithium-selenium batteries, have attracted widespread interests. Group 6A elements in the Periodical Table, such as sulfur and selenium, have shown two-electron reaction mechanisms in the electrochemical reaction process with lithium. Despite the theoretical mass specific capacity of selenium (675 mAh/g) being lower than that of sulfur (1675 mAh/g), selenium has a higher density (4.82 $g/cm^3$) than sulfur (2.07 $g/cm^3$) Therefore the theoretical volumetric energy density of selenium (3253 $mAh/cm^3$) is close to the theoretical volumetric energy density of sulfur (3467 $mAh/cm^3$). At the same time, as compared with sulfur, which is close to an electrically insulating material, selenium is semi-conductive electrically and shows better electrical conductive properties. Therefore, as compared to sulfur, selenium can demonstrate a higher level of activity and better utilization efficiency even at a higher loading level, leading to high energy and power density battery systems. Moreover, a selenium-carbon composite can have a further improvement in the electrical conductivity over sulfur-carbon composite to obtain a higher activity electrode material.

As described in patent publication no. CN 104393304A, by passing hydrogen selenide gas through a graphene dispersion solution, the solvent heat reduces the graphene oxide into graphene while oxidizes the hydrogen selenide into selenium. The thus prepared selenium graphene electrode material pairs with an ether electrolyte system, 1.5M lithium bi-trifluoromethane sulfonimide (LiTFSI)/1,3-dioxolane (DOL) dimethyl ether (DME) (volume ratio 1:1); the charging specific capacity reaches 640 mAh/g (approaching selenium theoretical specific capacity) in the first cycle. But in the charge-discharge process, polyselenide ions dissolve in the electrolyte, showing significant amounts of the shuttle effect, which causes the subsequent capacity decay. At the same tune, the procedures for preparing the graphene oxide raw material that is used in this process are complicated, not suitable for industrial production.

Patent CN104201389B discloses a lithium-selenium battery cathode material, utilizing a nitrogen-containing layered porous carbon composite current-collector which was compounded with selenium. In preparing the nitrogen-containing layered porous carbon composite current collector, nitrogen-containing conductive polymer is first deposited or grown on the surface of a piece of paper, followed by alkali activation and high temperature carbonization, resulting in a nitrogen-containing layered porous carbon composite current collector with carbon fiber as network structure that supports itself; and such nitrogen-containing layered porous carbon composite current collector is then further compounded with selenium. The deposition method for preparing a conductive polymer is complicated and the process for film formation or growth is hard to control. The preparation process is complicated, which associates with undesirably high costs.

Moreover, the demand for a long life, high-energy-density and high-power-density rechargeable battery with the ability of being charged and discharged at a fast rate is ever increasing in electronics, electric/hybrid vehicles, aerospace/drones, submarines, and other industrial, military, and consumer applications. Lithium ion batteries are examples of rechargeable batteries in the above-mentioned applications. However, the need for better performance and cycling capability have not been filled with lithium ion batteries as the technology in lithium ion battery has matured.

Atomic oxygen has an atomic weight 16 and has a capability for 2 electron transfers. A lithium-oxygen rechargeable battery has been studied for the purpose of making high energy density batteries. When a battery involves an oxygen cathode that pairs with lithium or sodium metal as an anode, it has the greatest stoichiometric energy density. However, a majority of technical problems in the Li//Na-Oxygen battery remains unresolved.

Elemental sulfur is also in the oxygen group and has the second highest energy density (after oxygen) when paired with a lithium or sodium metal anode. A lithium-sulfur or sodium-sulfur battery has been widely studied. However, polysulfide ions (intermediates) that form during the Li—S or Na—S battery discharging process dissolve in the electrolyte and shuttle from cathode to anode. Upon reaching the anode, polysulfide anions react with lithium or sodium metal, resulting in a loss of energy density, which is undesirable for a battery system. In addition, sulfur is an insulator, which requires a high loading level of carbon materials to achieve a minimum level of electrical conductivity. Due to the extremely low electrical conductivity of sulfur, a Li/Na—S rechargeable battery is very difficult to discharge or charge at a fast rate.

SUMMARY OF THE INVENTION

Disclosed herein is a process to prepare a two-dimensional carbon nanomaterial, which has a high degree of graphitization. The two-dimensional carbon nanomaterials are compounded with selenium to obtain a carbon-selenium composite material, which is used as a cathode material that pairs with anode material containing lithium, resulting in a lithium-selenium battery that has a high energy density and stable electrochemical performances. A similar process can be used to further assemble a pouch cell, which also demonstrates excellent electrochemical properties.

Also disclosed is a method to prepare selenium-carbon composite material with readily available raw materials and simple preparation procedures.

The selenium-carbon composite material described herein can be obtained from a preparation method that comprises the following steps:

(1) Carbonize alkali metal organic salts or alkaline earth metal organic salts in high temperature, and then wash with dilute hydrochloric acid or some other acids, and dry to obtain a two-dimensional carbon material;

(2) Mix the two-dimensional carbon material obtained in step (1) with selenium in organic solution, heat and evaporate the organic solvent, and then achieve compounding selenium with the two-dimensional carbon material through a multi-stage heat ramping and soaking procedure to obtain carbon-selenium composite.

In step (1), the alkali metal organic salt can be selected from one or several of potassium citrate, potassium gluconate, and sucrose acid sodium. The alkaline earth metal organic salt can be selected from one or both of calcium gluconate, and sucrose acid calcium. The high temperature carbonization can be performed at 600-1000° C., desirably, 700-900° C.; carbonation time for 1-10 hours, desirably for 3-5 hours.

In step (2), the organic solvent can be selected from one or several of ethanol, dimethylsulfoxide (DMSO), toluene, acetonitrile, N,N-dimethylformamide (DMF), carbon tetrachloride, and diethyl ether or ethyl acetate; multi-stage heat ramping and soaking section can be referred as to a ramping rate 2-10° C./min, desirably 5-8° C./min, to a temperature between 200 and 300° C., desirably between 220 and 280° C., followed by soaking at the temperature for 3-10 hours, desirably, 3-4 hours; then continue to heat up to 400-600° C., desirably, 430-460° C., followed by soaking for 10-30 hours, desirably 15-20 hours.

Also disclosed herein is a lithium-selenium secondary battery that comprises the carbon-selenium composite materials. The lithium-selenium secondary battery can further include: a lithium-containing anode, a separator, and an electrolyte.

The lithium-containing anode may be one or several of lithium metal, a lithiated graphite anode, and lithiated silicon carbon anode materials (through assembling the graphite and silicon-carbon anode materials and lithium anode into a half cell battery, discharge to prepare lithiated graphite anode and lithiated silicon-carbon anode materials). The separator (membrane) can be a commercially available membrane, such as, without limitation, a Celgard membrane, a Whatman membrane, a cellulose membrane, or a polymer membrane. The electrolyte can be one or several of a carbonate electrolyte, an ether electrolyte, and ionic liquids.

The carbonate electrolyte can be selected from one or several from diethyl carbonate (DEC), dimethyl carbonate (DMC), ethylene carbonate (EC), ethyl methyl carbonate (EMC), and propylene carbonate (PC); and the solute can be selected from one or several from lithium hexafluoro phosphate ($LiPF_6$), lithium bis(trifluoromethanesulfonyl) imide (LiTFSI), lithium perchlorate ($LiClO_4$) and lithium bis(fluorosulfonyl) imide (LiFSI).

For the ether electrolytic solution, the solvent can be selected one or several from 1,3-dioxolane (DOL), ethylene glycol dimethyl ether (DME) and triethylene glycol dimethyl ether (TEGDME); and the solute can be selected in one or more from lithium hexafluorophosphate ($LiPF_6$), lithium bis-(trifluoromethanesulfonyl) imide (LiTFSI), lithium perchlorate ($LiClO_4$) and lithium bis-fluorosulfonylimide (LiFSI).

For ionic liquids, the ionic liquid can be one or more room temperature ionic liquid [EMIm] NTf2 (1-ethyl-3-methylimidazolium his trifluoromethane sulfonimide salt), [Py13] NTf2 (N-Propyl-N-methylpyrrolidine his trifluoromethane sulfonimide salt), [PP13] NTf2 (N-propyl-methylpiperidine alkoxy-N-Bis trifluoromethane sulfonimide salts); and the solute can be selected in one or more from lithium hexafluorophosphate ($LiPF_6$), bis(trifluoromethylsulfonyl) imide (LiTFSI), lithium perchlorate ($LiClO_4$) and lithium bis fluorosulfonylimide (LiFSI).

Also described herein is a lithium-selenium pouch cell battery that includes the carbon selenium composite material.

Compared to the prior art, with respect to the method for preparing selenium carbon composite material disclosed herein, the two-dimensional carbon material has the advantages that the raw materials are readily available at low cost, the preparation method is simple, highly practical and suitable for mass production, and the obtained selenium carbon composite material exhibits excellent electrochemical properties.

Also disclosed herein is immobilized selenium (an immobilized selenium body) comprising selenium and a carbon skeleton. The immobilized selenium comprises at least one of the following: (a) requires gaining enough energy for a selenium particle to reach a kinetic energy of $\geq 9.5$ kJ/mole, $\geq 9.7$ kJ/mole, $\geq 9.9$ kJ/mole, $\geq 10.1$ kJ/mole, $\geq 10.3$ kJ/mole, or $\geq 10.5$ kJ/mole to escape the immobilized selenium system; (b) a temperature of 490° C. or higher, $\geq 500°$ C., $\geq 510°$ C., $\geq 520°$ C., $\geq 530°$ C., $\geq 540°$ C., $\geq 550°$ C., or $\geq 560°$ C. is required for selenium particles to gain enough energy to escape the immobilized selenium system; (c) the carbon skeleton has a surface area (with pores less than 20 angstroms) $\geq 500$ m$^2$/g, $\geq 600$ m$^2$/g, $\geq 700$ m$^2$/g, $\geq 800$ m$^2$/g, $\geq 900$ m$^2$/g, or $\geq 1,000$ m$^2$/g; (d) the carbon skeleton has a surface area (for pores between 20 angstroms and 1000 angstroms) 20% or less, 15% or less, 10% or less, 5% or less, 3% or less, 2% or less, 1% or less of the total surface area.

Also disclosed herein is a cathode or a rechargeable battery comprising immobilized selenium. The selenium may be doped with other elements, such as, but not limited to, sulfur.

Also disclosed herein is a composite including selenium and carbon comprising platelet morphology with as aspect ratio of $\geq 1$, $\geq 2$, $\geq 5$, $\geq 10$, or $\geq 20$.

Also disclosed herein is a cathode including a composite comprising selenium and carbon and comprising platelet morphology with an aspect ratio of $\geq 1$, $\geq 2$, $\geq 5$, $\geq 10$, or $\geq 20$. Also disclosed herein is a rechargeable battery including a composite comprising selenium and carbon and comprising platelet morphology with the foregoing aspect ratio.

Also disclosed herein is a rechargeable battery comprising a cathode, an anode, a separator, and an electrolyte. The rechargeable battery can be charged at 0.1C, 0.2C, 0.5C, 1C, 1.5C, 2C, 3C, 4C, 5C, 6C, 7C, 8C, 9C, 10C or faster. The cathode can comprise at least one element of a chalcogen group such as selenium, sulfur, tellurium, and oxygen. The anode can comprise at least one element of an alkali metal, alkali earth metals, and a group IIIA metal or metals. The separator can comprise an organic separator or an inorganic separator whose surface can optionally be modified. The electrolyte can comprise at least one element of alkali metals, alkali earth metals, and a group IIIA metal or metals. The solvent in the electrolyte solution can comprise organic solvents, carbonate-based, ether-based, or ester-based.

The rechargeable battery may have a specific capacity of 400 mAh/g or higher, 450 mAh/g or higher, 500 mAh/g or higher, 550 mAh/g or higher, or 600 mAh/g or higher. The rechargeable battery may be able to undergo electrochemical cycling for 50 cycle or more, 75 cycles or more, 100 cycles or more, 200 cycles or more, etc. The rechargeable battery may retain a battery specific capacity greater than 30%, greater than 40%, greater than 50%, greater than 60%, greater than 70%, or greater than 80% of the $2^{nd}$ discharge specific capacity at a cycling rate of 0.1C after conducting high C-Rate charge-discharge cycling (e.g., 5 cycles at 0.1C, 5 cycles at 0.2C, 5 cycles at 0.5C, 5 cycles at 1C, 5 cycles at 2C, 5 cycles at 5C, and 5 cycles at 10C). The rechargeable battery may have a Coulombic efficiency ≥50%, ≥60%, ≥70%, ≥80%, or ≥90%. The rechargeable battery can be used for electronics, an electric or hybrid vehicle, an industrial application, a military application such as a drone, an aerospace application, a marine application, etc.

DESCRIPTION OF THE INVENTION

In conjunction with the specific examples, the present invention will be further described below. Unless otherwise specified, the experimental methods in the following examples are all conventional; the reagents and materials are all available from commercial sources.

Example 1

(A) Preparation of Selenium Carbon Composite Material

Figure 1:
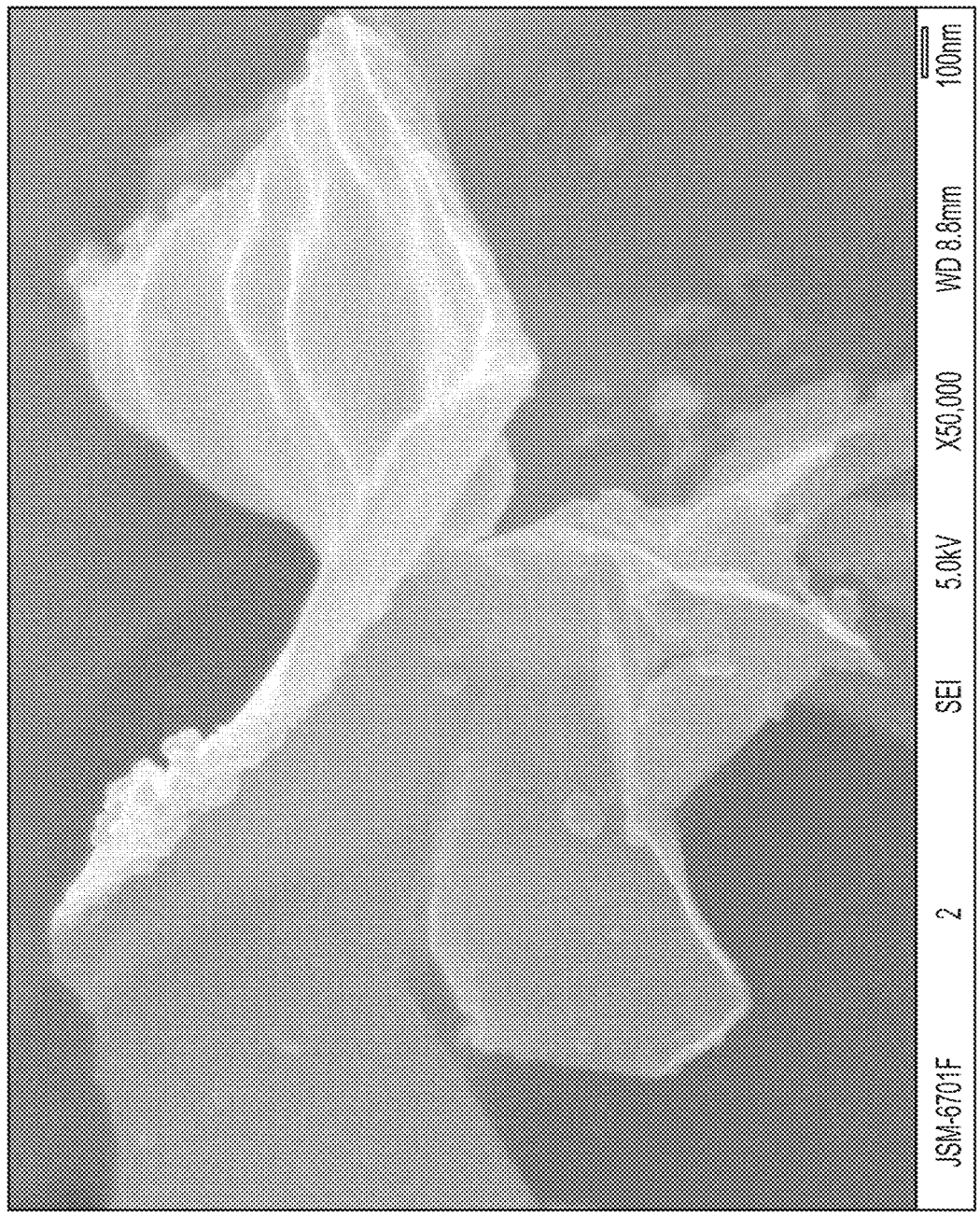
FIG. 1 is a 50,000× scanning electron microscope photograph of the carbon material of Example 1.

After grinding and milling, an appropriate amount of potassium citrate is calcined at 800° C. for 5 hours under an inert atmosphere, and cooled to room temperature. Washed with dilute hydrochloric acid to a neutral pH; filtered and dried to give a two-dimensional carbon nanomaterial (FIG. 1); according to the mass ratio of 50:50, weigh the two dimensional carbon material and selenium, and then stir and mix with the ethanol solution of selenium uniformly; after solvent evaporation, dry the mixture in dry oven; the dried mixture was heated at 5° C./min to 240° C. and soaked for 3 hours; then continues to heat up at 5° C./rein to 450° C.; soaked for 2.0 hours; cooled to room temperature, which resulted in the selenium carbon composite material.

(B) Preparation of the Selenium Carbon Composite Cathode

The above-prepared selenium carbon composites are mixed with carbon black Super P (TIMCAL) and binder CMC/SBR (weight ratio 1:1) along with water by a fixed formulation by pulping, coating, drying and other procedures to obtain a selenium carbon composite cathode.

(C) Assembling Lithium—Selenium Battery

Figure 4:
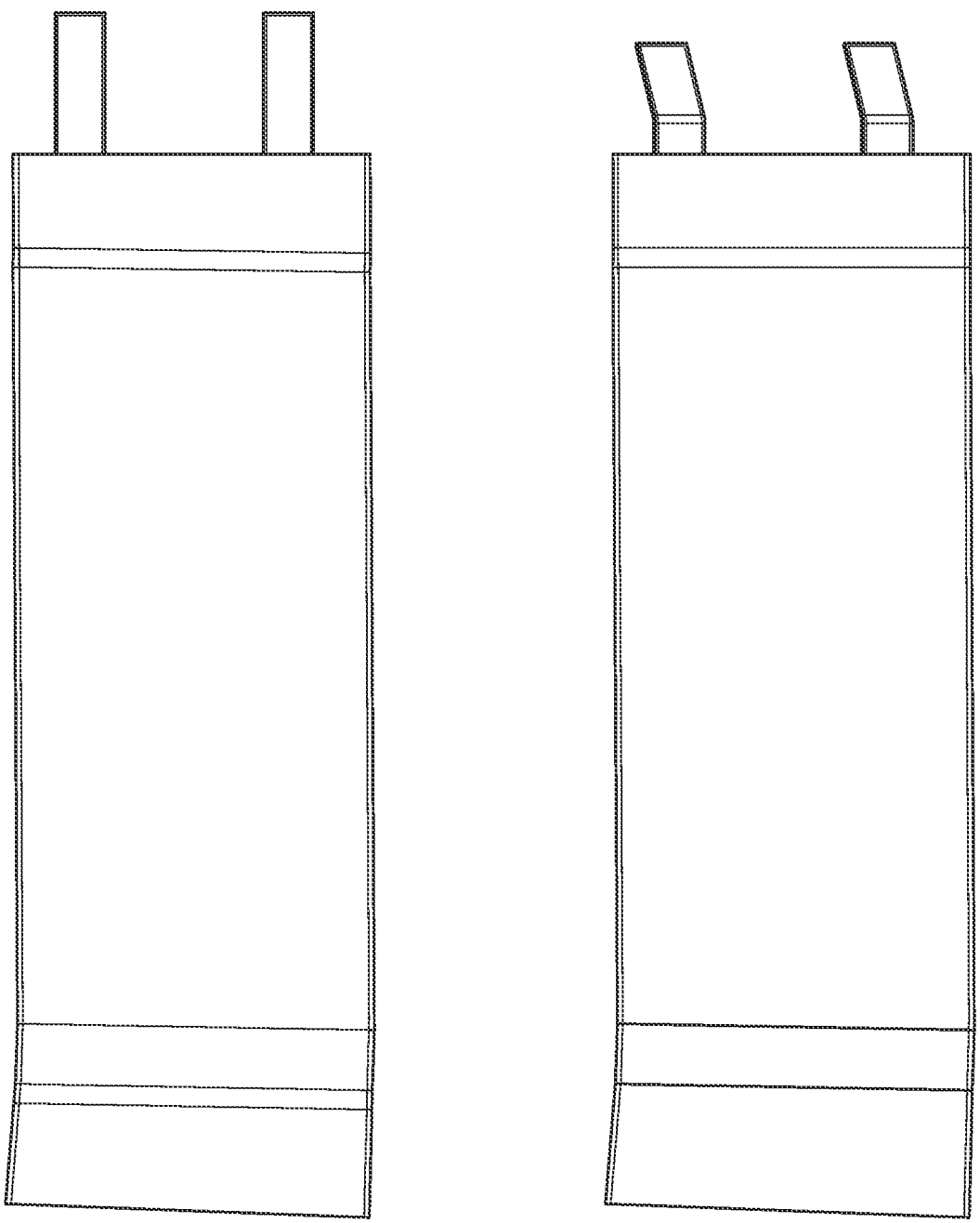
FIG. 4 is a schematic illustration of the pouch cell battery of Example 1.

The above-prepared selenium carbon composite cathode, lithium foil as anode, Celgard diaphragm as separator and 1M LiPF$_6$ in EC/DMC as the electrolyte were assembled into a lithium selenium coin cell battery and a lithium selenium pouch cell battery, a schematic illustration of which is provided in FIG. 4.

(D) Lithium-Selenium Battery Test

Figure 2:
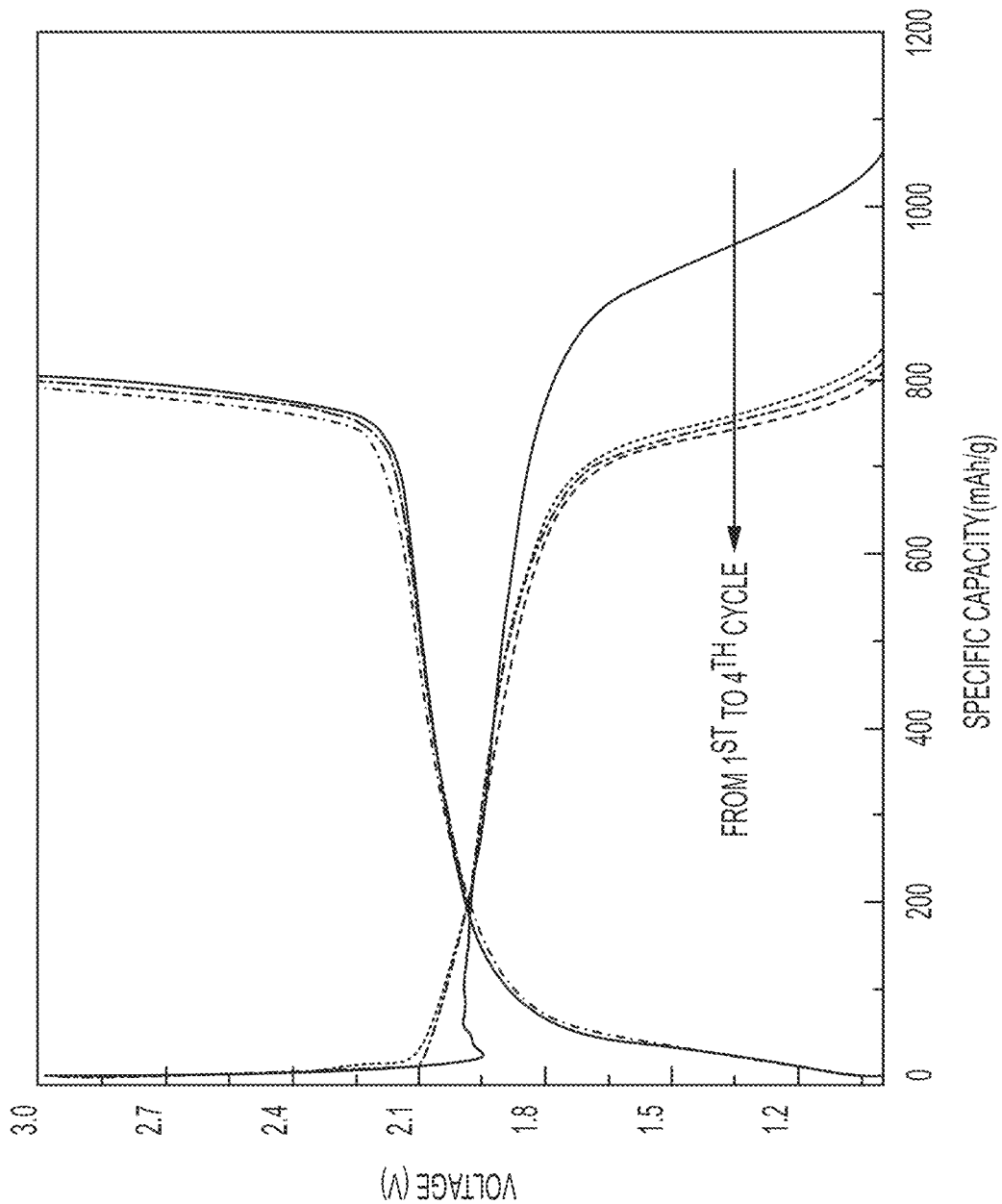
FIG. 2 is a 0.1C charge and discharge curve of the lithium selenium battery of Example 1.
Figure 5:
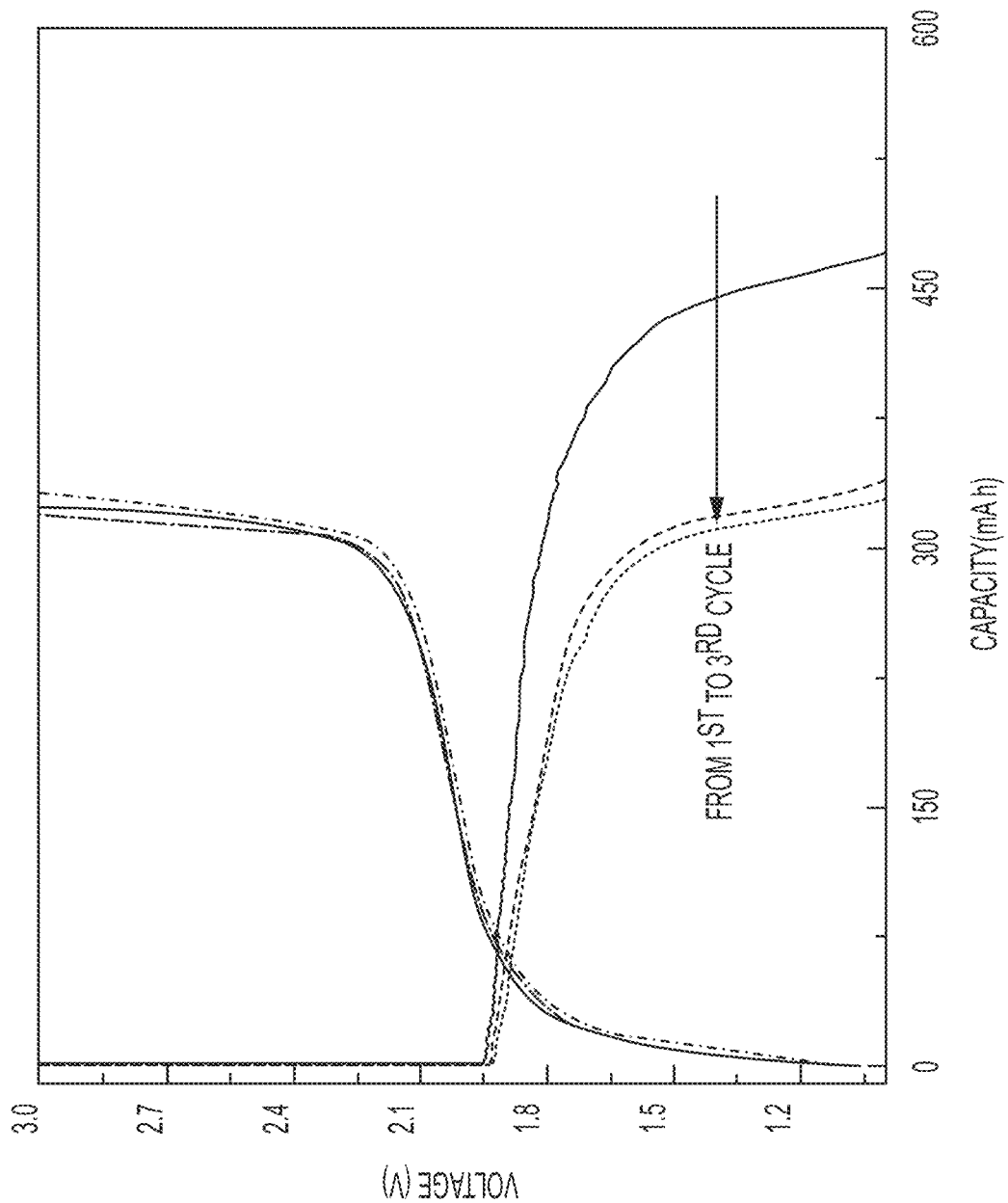
FIG. 5 is a 0.05C charge and discharge curve of the pouch cell battery of Example 1.

Use a charge-discharge apparatus to perform a constant current charge discharge test on the lithium-selenium coin cell battery and lithium selenium pouch cell battery. Test voltage range is between 1.0 and 3.0 V and test temperature is 25° C. Discharge specific capacity and the level of charge-discharge current are standardly calculated based on the mass of selenium. The charge-discharge current is 0.1C or 0.05C. The lithium selenium coin charge and discharge curve is shown in FIG. 2, the specific test results are shown in Table 1 below. Lithium selenium pouch cell test results are shown in FIG. 5.

Example 2

Conditions are the same as in Example 1, with the exception that the raw material carbonized for two-dimensional carbon is sodium citrate. Battery test results are summarized in Table 1 below.

Example 3

Conditions are the same as in Example 1, with the exception that the raw material carbonized for two-dimensional carbon is potassium gluconate. Battery test results are summarized in Table 1 below.

Example 4

Conditions are the same as in Example 1, with the exception that the high-temperature carbonization temperature for the carbon material is 650° C. Battery test results are summarized in Table 1 below.

Example 5

Conditions are the same as in Example 1, with the exception that the dried mixture was heated at 5° C./min to 300 and soaked at this temperature for 3 hours. Battery test results are summarized in Table 1 below.

Example 6

Conditions are the same as in Example 1, with the exception that the dried mixture was heated at 5° C./min to 240° C. and soaked at this temperature for 3 hours, then continued to heat up to 600° C., and soaked at this constant temperature for 20 hours. Battery test results are summarized in Table 1 below.

Example 7

Conditions are the same as in Example 1, with the exception that the lithium-Se battery is packed with lithiated graphite anode, instead of the lithium anode sheet. Battery test results are summarized in Table 1 below.

Example 8

Conditions are the same as in Example 1, with the exception that the lithium-Se battery is packed with lithiated silicon carbon anode, instead of the lithium anode sheet. Battery test results are summarized in Table 1 below.

Comparative Example 1

Conditions are the same as in Example 1, with the exception that the use of polyacrylonitrile as the raw material. Battery test results are summarized in Table 1 below.

Comparative Example 2

Figure 3:
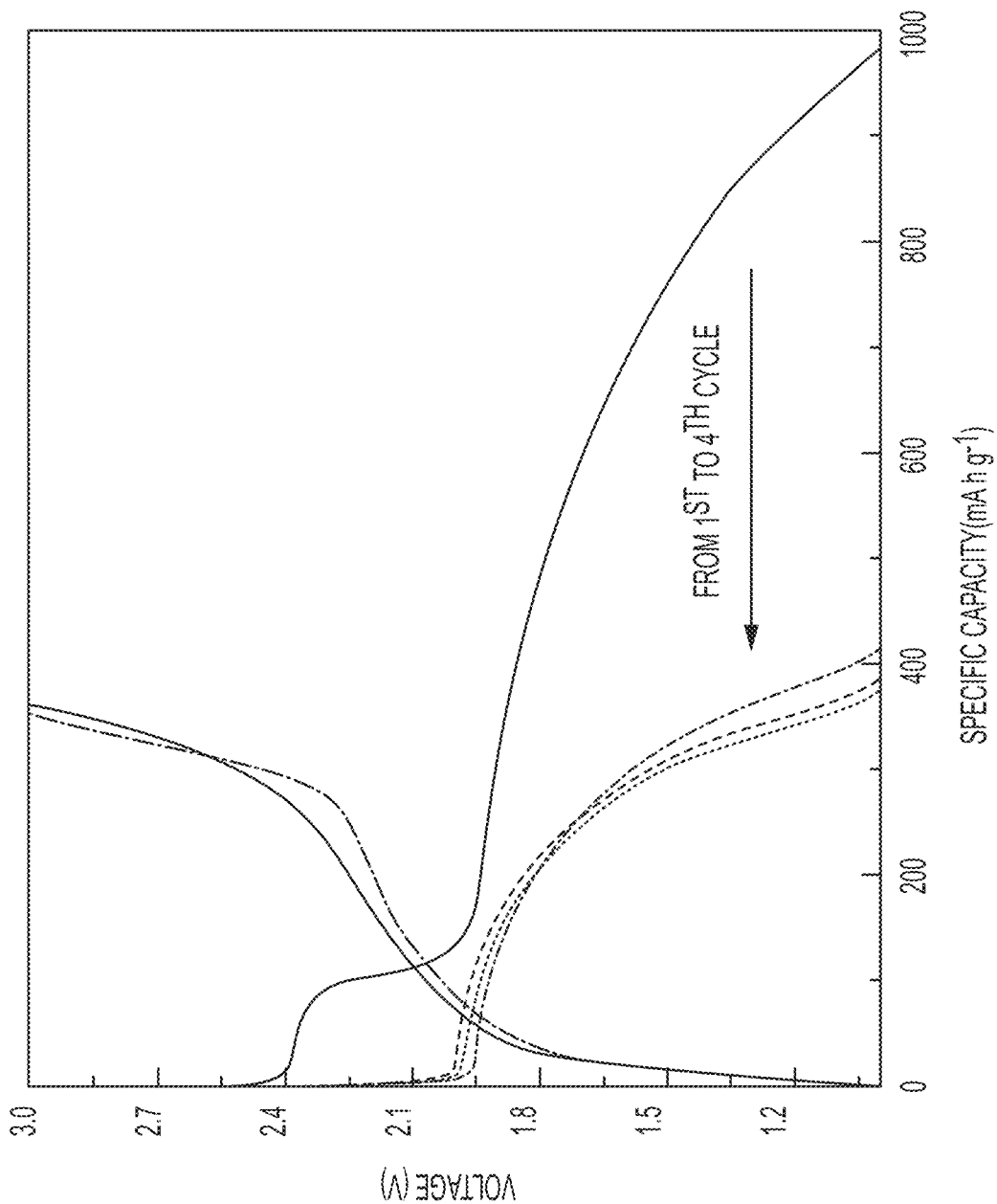
FIG. 3 is a 0.1C charge and discharge curve of the lithium selenium battery of comparative Example 2.

Conditions are the same as in Example 1; with the exception that a one-step compound method is used to prepare the selenium and carbon composite. In this example, the dried selenium carbon mixture was heated at 5° C./min to 500° C. and soaked at this temperature for 23 hours to obtain selenium carbon composite material. The charge-discharge curve of a battery made from the thus obtained selenium carbon composite material is shown in FIG. 3; the battery test results are summarized in Table 1 below.

Table 1 Summarized Battery Test Results

| Numbering | The first cycle discharge capacity (mAh/g) | The first cycle charge capacity/the first cycle discharge capacity (%) | The $50^{th}$ cycle capacity (mAh/g) |
| --- | --- | --- | --- |
| Example 1 | 1,050 | 78.1 | 756 |
| Example 2 | 940 | 74.6 | 672 |
| Example 3 | 962 | 75.3 | 683 |
| Example 4 | 987 | 72.1 | 680 |
| Example 5 | 936 | 73.2 | 653 |
| Example 6 | 972 | 70 | 661 |
| Example 7 | 836 | 72.5 | 580 |
| Example 8 | 910 | 73 | 600 |
| Comparative Example 1 | 635 | 55 | 350 |
| Comparative Example 2 | 980 | 40.8 | 386 |

Having thus described a method of preparing a selenium carbon composite material, a method of making immobilized selenium and the use of the immobilized selenium, e.g., in a rechargeable battery, will be described.

Selenium is an element in the same group as oxygen and sulfur namely, Group 6 of the Periodic Table of the elements. Selenium may be advantageous over oxygen and sulfur in term of its substantially high electrical conductivity. US 2012/0225352 discloses making Li-selenium and Na-selenium rechargeable batteries, with good capacity and cycling capability. However, a certain level of polyselenide anions shuttle between the cathodes and anodes of such batteries, resulting in additional electrochemical performances that need to be substantially improved for practical uses. Literature relevant to this field includes the following:

"Electrode Materials for Rechargeable Batteries", Ali Aboulmrane and Khalil Amine, US Patent Application 2012/0225352, Sep. 6, 2012.

"Lithium-Selenium Secondary Batteries Having non-Flammable Electrolyte", Hui He, Bor Z. Jang, Yanbo Wang, and Aruna Zhamu, US Patent Application 2015/0064575, Mar. 5, 2015.

"Electrolyte Solution and Sulfur-based or Selenium-based Batteries including the Electrolyte Solution", Fang Dai, Mei Cai, Qiangfeng Xiao, and Li Yang, US Patent Application 2016/0020491, Jan. 21, 2016.

"A New Class of Lithium and Sodium Rechargeable Batteries Based on Selenium and Selenium-Sulfur as a Positive Electrode", Ali Abouimrane, Damien Dambournet, Kerena W. Chapman, Peter J. Chupa, Wei Wang, and Khalil Amine, *J. Am. Chem. Soc.* 2012, 134, 4505-4508.

"A Free-Standing and Ultralong-life Lithium-Selenium Battery Cathode Enabled by 3D Mesoporous Carbon/Graphene Hierachical Architecture", Kai Han, Zhao Liu, Jingmei Shen, Yuyuan Lin, Fand Dai, and Hongqi Ye, *Adv. Funct. Mater.*, 2015, 25, 455-463.

"Micro- and Mesoporous Carbide-Derived Carbon-Selenium Cathodes for High-Performance Lithium Selenium Batteries", Jung Tai Lee, Hyea Kim, Marin Oschatz, Dong-Chan Lee, Feixiang Wu, Huan-Ting Lin, Bogdan Zdyrko, Wan Il Chao, Stefan Kaskel, and Gleb Yushin, *Adv. Energy Mater.* 2014, 1400981.

"High-Performance Lithium Selenium Battery with Se/Microporous Carbon Composite Cathode and Carbonate-Based Electrolyte", Chao Wu, Lixia Yuan, Zhen Li, Ziqi Yi, Rui Zeng, Yanrong Li, and Yunhui Huang, *Sci. China Mater.* 2015, 58, 91-97.

"Advanced Se—C Nanocomposites: a Bifunctional Electrode Material for both Li—Se and Li-ion Batteries", Huan Ye, Ya-Xia Yin, Shuai-Feng Zhang, and Yu-Guo Guo, *J. Mater. Chem. A.,* May 23, 2014.

"Lithium Iodide as a Promising Electrolyte Additive for Lithium-Sulfur Batteries: Mechanisms of Performance Enhancement", Feixiang Wu, Jung Tae Lee, Naoki Nitta, Hyea Kim, Oleg Borodin, and Gleb Yushin, *Adv. Mater.* 2015, 27, 101-108.

"A Se/C Composite as Cathode Material for Rechargeable Lithium Batteries with Good Electrochemical Performance", Lili Li, Yuyang Hou, Yaqiong Yang, Minxia Li, Xiaowei Wang, and Yuping Wu, *RSC Adv.,* 2014, 4, 9086-9091.

"Elemental Selenium for Electrochemical Energy Storage", Chun-Peng Yang, Ya-Xia Yin, and Yu-Guo Guo, *J. Phys. Chem. Lett.* 2015, 6, 256-266.

"Selenium@mesoporous Carbon Composite with Superior Lithium and Sodium Storage Capacity", Chao Luo, Yunhua Xu, Yujie Zhu, Yihang Liu, Shiyou Zheng, Ying Liu, Alex Langrock, and Chunsheng Wang, *ACSNANO*, Vol. 7, No. 9, 8003-8010.

Also disclosed herein is immobilized selenium comprising selenium and carbon. Immobilized selenium may comprise elemental form selenium or compound form selenium. Selenium may be doped with other element, such as, but not limited to, sulfur. The immobilized selenium enables the localization of elemental selenium atoms which function electrochemically properly without being shuttled between a cathode and an anode of a battery. Immobilization of selenium allows an elemental selenium atom to gain two electrons during a discharge process and to form a selenide anion at the location where the selenium molecule/atom is immobilized. The selenide anion can then give up two electrons during a charging process to form an elemental selenium atom. Therefore, immobilized selenium can work as an electrochemical active agent for a rechargeable battery that has a specific capacity that may be up to a stoichiometric level, can have a Coulombic efficiency that may be ≥95%, ≥98%, or as high as 100%, and can achieve a substantially-improved sustainable cycling capability.

In a battery made with immobilized selenium the electrochemical behaviors of elemental selenium atoms and selenide anions during charging are processes that desirably function properly. Carbon skeletons possessing $Sp^2$ carbon-carbon bonds have delocalized electrons distributed over a conjugated six-member-ring aromatic $\pi$-bonds across G-band graphene-like local networks that are bounded by D-band carbon. In the presence of an electrical potential, such delocalized electrons may flow with little or no electrical resistance across the carbon skeleton. Selenium immobilization can also compress a carbon skeleton's $Sp^2$ carbon-carbon bonds, resulting in stronger carbon-carbon bonds, possibly leading to improved electron conductivity within the carbon skeleton network. At the same time, selenium immobilization may also lead to compression of selenium particles, resulting in stronger selenium-selenium chemical and physical interactions, possibly leading to improved electrical conductivity among immobilized selenium particles. When both carbon-carbon bonds and Se—Se bonds are enhanced due to selenium immobilization, carbon-selenium interactions are also enhanced by the compression in addition to the presence of a stabilized selenium portion to which carbon skeleton can bond. This portion of the selenium may act as an interface layer for a carbon skeleton to successfully immobilize the stabilized selenium portion. Therefore, electrons may flow with a minimal electrical resistance between the carbon skeleton and the immobilized selenium, whereupon the electrochemical charge/discharge processes may function efficiently in a rechargeable battery. This, in turn, allows the rechargeable battery to maintain a near-stoichiometric specific capacity and have the capability of cycling at almost any practical rate with a low level of damage to the electrochemical performance of the battery.

A carbon skeleton may be porous and may be doped with another composition. The pore size distributions of the carbon skeleton may range between sub angstrom to a few microns or to a pore size that a pore size distribution instrument can characterize by using nitrogen, argon, $CO_2$ or other absorbent as a probing molecule. The porosity of the carbon skeleton may comprise a pore size distribution that peaks in the range of at least one of the following: between sub-angstrom and 1000 angstroms, or between one angstrom and 100 angstroms, or between one angstrom and 50 angstroms, or between one angstrom and 30 angstroms, and or between one angstrom and 20 angstroms. The porosity of the carbon skeleton may further comprise pores having a pore size distribution with more than one peak in the ranges described in the previous statement. Immobilized selenium may favor carbon skeleton having small pore sizes in which electrons may be delivered and harvested quickly with minimum electrical resistance, which may allow the selenium to function more properly electrochemically in a rechargeable battery. The small pore size may also provide more carbon skeleton surface area where the first portion of the selenium can form a first interface layer for a second portion of selenium immobilization. In addition, the presence in a carbon skeleton having a certain portion of medium size pores and a certain portion of large size pores may also be beneficial for effective delivery of solvent lithium ions from bulk solvent media to a small pore region where lithium ions may lose coordinated solvent molecules and get transported in solid phase of lithium selenide.

The pore volume of the carbon skeleton may be as low as 0.01 mL/g and may be as much as 5 mL/g, or may be between 0.01 mL/g and 3 mL/g, or may be between 0.03 mL/g and 2.5 mL/g, or may be between 0.05 mL/g and 2.0 mL/g. The pore volume having pore sizes less than 100 angstroms, or less than 50 angstrom, or less than 30 angstroms, or less than 20 angstroms may be greater than 30%, or greater than 40%, or greater than 50%, or greater than 60%, or greater than 70%, or greater than 80% of the total measurable pore volume that can be measured by using a BET instrument with nitrogen, $CO_2$, argon, and other probing gas molecules. The BET determined surface area of the carbon may be greater than 400 $m^2/g$, or greater than 500 m²/g, or greater than 600 m²/g, or greater than 700 m²/g, or greater than 800 m²/g, or greater than 900 m²/g, or greater than 1000 m²/g.

The carbon may also be substantially amorphous, or it may have a characteristic of a very broad peak centered at a d-spacing around 5 angstroms.

The carbon may comprise $Sp^2$ carbon-carbon bonds, having Raman peak shifts featuring a D-band and a G-band. In an example, $Sp^2$ carbon-carbon bonds of the carbon feature a D-band centered at $1364\pm100$ cm$^{-1}$ with a FWHM about $296\pm50$ cm$^{-1}$ and a G-band center at $1589\pm100$ cm$^{-1}$ with a FWHM about $96\pm50$ cm$^{-1}$ in Raman spectrum. The ratio of the area of D-band to G-band may range from 0.01 to 100, or from 0.1 to 50, or from 0.2 and 20.

The carbon may be of any morphology, namely, for example, platelet, sphere, fiber, needle, tubular, irregular, interconnected, agglomerated, discrete, or any solid particles. Platelet, fiber, needle, tubular, or some morphology having a certain level of aspect ratio may be beneficial for achieving better inter-particle contact, resulting in better electrical conductivity, possibly enhancing rechargeable battery performance.

The carbon may be of any particle size, having a median particle size from a nanometer to a few millimeters, or from a few nanometers to less than 1000 microns, or from 20 nm to 100 microns.

The property of a carbon skeleton can affect selenium immobilization and interactions between the carbon skeleton surface and selenium particles can affect the performance of a rechargeable battery. The location of $Sp^2$ carbon in a carbon skeleton can aid in achieving Se immobilization. $Sp^2$ carbon from small carbon skeleton pores may be favored, which can be quantified by NLDFT surface area method, as discussed in the Example 9 herein. The surface area from carbon skeleton pores less than 20 angstroms may be $\geq500$ m²/g, $\geq600$ m²/g, $\geq700$ m²/g, $\geq800$ m²/g, $\geq900$ m²/g, or $\geq1,000$ m²/g. The surface areas from the carbon skeleton pores between 20 angstroms and 1000 angstroms may be 20% or less, 15% or less, 10% or less, 5% or less, 3% or less, 2% or less, or 1% or less of the total surface area of the carbon skeleton.

Immobilized selenium can comprise selenium that vaporizes at a temperature higher than elemental selenium, referring to the following definition of selenium vaporization: Elemental selenium in a Se-Super P composite loses 50% of its weight at a temperature of 480° C.; elemental selenium in a Se/Graphite composite loses its weight by 50% of the contained selenium at a temperature of 471° C. Immobilized selenium loses 50% of its weight at a temperature higher than 480° C., for example at a temperature $\geq490°$ C., $\geq500°$ C., $\geq510°$ C., $\geq520°$ C., $\geq530°$ C., $\geq540°$ C., $\geq550°$ C., $\geq560°$ C., $\geq570°$ C., or $\geq580°$ C. or more. Selenium in the immobilized selenium may need a kinetic energy of $\geq9.5$ kJ/mole, $\geq9.7$ kJ/mole, $\geq9.9$ kJ/mole, $\geq10.1$ kJ/mole, $\geq10.3$ kJ/mole, or $\geq10.5$ kJ/mole or more to overcome the bonding and or intermolecular forces in the immobilized selenium system and to escape to the gas phase. In an example, the last portion of the immobilized selenium that vaporizes can require a kinetic energy of 11,635 joules/mole 660° C.) to escape the carbon skeleton and may be critical for selenium immobilization and may work as interfacial material between the carbon skeleton and the majority of the immobilized selenium molecules. Therefore, this portion of the selenium that requires a kinetic energy of 11,635 joules/mole is called interfacial selenium. The amount of interfacial selenium in the immobilized selenium may be $\geq1.5\%$, $\geq2.0\%$, $\geq2.5$ or 3.0% of the total immobilized selenium.

Immobilized selenium can comprise selenium that has an activation energy higher than that for conventional (non-immobilized) selenium to overcome in order for the selenium to escape from the immobilized Se—C composite system. The activation energy for non-immobilized selenium (Se-Super P composite system) was determined to be about 92 kJ/mole according to ASTM Method E1641-16. The activation energy for selenium in the immobilized selenium comprising selenium and carbon is $\geq95$ kJ/mole, $\geq98$ kJ/mole, $\geq101$ kJ/mole, $\geq104$ kJ/mole, $\geq107$ kJ/mole, or $\geq110$ kJ/mole. The activation energy for selenium in the immobilized selenium comprising selenium and carbon is $\geq3\%$, $\geq6\%$, $\geq9\%$, $\geq12\%$, $\geq15\%$, or $\geq18\%$ greater than that for selenium in Se-Super P composite. The immobilized selenium can be more stable than non-immobilized selenium, which is the reason that the battery comprising immobilized selenium may cycle electrochemically better, probably due to the minimization (or elimination) of selenium shuttling between cathode and anode, resulting from selenium being immobilized in Se—C composite.

Immobilized selenium may comprise selenium that may be Raman-inactive or Raman-active, typically having a Raman peak at $255\pm25$ cm$^{-1}$, or at $255\pm15$ cm$^{-1}$, or at $255\pm10$ cm$^{-1}$. Raman relative peak intensity is defined as the area of the Raman peak at 255 cm$^{-1}$ relative to the area of the D-band peak of the carbon Raman spectrum. Immobilized carbon may comprise selenium having a Raman relative peak intensity of $\geq0.1\%$, $\geq0.5\%$, $\geq1\%$, $\geq3\%$, $\geq5\%$ Immobilized selenium may contain $\geq5\%$ selenium, $\geq10\%$ selenium, $\geq20\%$ selenium, $\geq30\%$ selenium, $\geq40\%$ selenium, $\geq50\%$ selenium, $\geq60\%$ selenium, or $\geq70\%$ selenium.

Immobilized selenium can comprise selenium having a red shift from the Raman peak of pure selenium. A red shift is defined by a positive difference between the Raman peak location for the immobilized selenium and that for pure selenium. Pure selenium typically has a Raman peak at about 235 cm$^{-1}$ Immobilized selenium can comprise selenium that has a red shift of the Raman peak by $\geq4$ cm$^{1}$, $\geq6$ cm$^{1}$, $\geq8$ cm$^{-1}$, $\geq10$ cm$^{-1}$, $\geq12$ cm$^{-1}$, $\geq14$ cm$^{-1}$, or $\geq16$ cm$^{-1}$. A red shift in Raman peak suggests that there is a compression on the selenium particles.

Immobilized selenium can comprise carbon that may be under compression. Under compression, electrons can flow with a minimum resistance, which facilitates fast electron delivery to selenium and from selenium anions for electrochemical processes during discharge-charge processes for a rechargeable battery. D-band and or G-band in Raman spectrum for the $Sp^2$ carbon-carbon bonds of the carbon skeleton comprising the immobilized selenium may show a red shift, by $\geq1$ cm$^{-1}$, $\geq2$ cm$^{-1}$, $\geq3$ cm$^{-1}$, $\geq4$ cm$^{-1}$, or $\geq5$ cm$^{-1}$.

Immobilized selenium comprises selenium that can have a higher collision frequency than non-immobilized selenium. Such high collision frequency may result from selenium in the immobilized Se—C system that is under compression. The collision frequency for selenium in non-immobilized selenium was determined to be around $2.27\times10^5$, according to the ATSM Method E1641-16. The collision frequency for selenium in the immobilized selenium comprising selenium and carbon is $\geq2.5\times10^5$, $\geq3.0\times10^5$, $\geq3.5\times10^5$, $\geq4.0\times10^5$, $\geq4.5\times10^5$, $\geq5.0\times10^5$, $\geq5.5\times10^5$, $\geq6.0\times10^5$, or $\geq8.0\times10^5$. The immobilized selenium can have a higher collision frequency by $\geq10\%$, $\geq30\%$, $\geq50\%$, $\geq80\%$, $\geq100\%$, $\geq130\%$, $\geq150\%$, $\geq180\%$, or $\geq200\%$ than that for non-immobilized selenium in Se—C composite. This may lead to better electron conductivity in the immobilized selenium system because of more collisions among selenium species. The immobilized selenium in Se—C composite would also have a higher collision frequency against the wall of the carbon host (e.g., a carbon skeleton), which may result in a better delivery or harvesting of electrons from the carbon skeleton during electrochemical cycling, which can lead to a battery (comprising immobilized selenium) that has improved cycling performances, such as attaining more cycles and or cycling at a much higher C-rate, which is highly desirable.

Immobilized selenium comprises selenium that has less tendency to leave its host material (carbon), having a kinetic rate constant that is ≤1/5, ≤1/10, ≤1/50, ≤1/100, ≤1/500, or ≤1/1000 of the kinetic rate constant for non-immobilized/conventional selenium. In our example, immobilized selenium comprises selenium that has less tendency to leave its host material (carbon), having a kinetic rate constant (at 50° C.) of $\leq 1\times10^{-10}$, $\leq 5\times10^{-11}$, $\leq 1\times10^{-11}$, $\leq 5\times10^{-12}$, or $\leq 5\times10^{-13}$.

Immobilized selenium can comprise selenium that may be amorphous, as determined by X-ray diffraction measurements. A diffraction peak having a d-spacing of about 5.2 angstroms is relatively smaller or weaker, for example, 10% weaker, 20% weaker, 30% weaker, or 40% weaker, than that for the carbon skeleton.

Immobilized selenium may be prepared by physically mixing carbon and selenium followed by melting and homogenizing (or mixing or blending) selenium molecules to achieve selenium immobilization. The physical mixing may be achieved by ball-milling (dry and wet), mixing with mortar and pestle (dry or wet), jet-milling, horizontal milling, attrition milling, high shear mixing in slurries, regular slurry mixing with blade, etc. The physically mixed mixture of selenium and carbon may be heated at a temperature that is at or higher than the melting point of selenium and below the melting temperature of carbon. The heating may be carried out in an inert gas environment such as, but not limited to, argon, helium, nitrogen, etc. The heating environment may comprise air or a reactive environment. Immobilization of selenium may be achieved by impregnating dissolved selenium into carbon, followed by evaporation of the solvent. The solvent for dissolving selenium may comprise an alcohol, an ether, an ester, a ketone, a hydrocarbon, a halogenated hydrocarbon, a nitrogen-containing compound, a phosphorus containing compound, a sulfur-containing compound, water, etc.

Immobilized selenium can be achieved by melting a large amount of selenium in the presence of carbon, followed by removing extra non-immobilized selenium.

An immobilized selenium system or body may comprise immobilized selenium ≥30%, ≥40%, ≥50%, ≥60%, ≥70%, ≥80%, or ≥90% of the total amount of selenium in the system or body. The non-immobilized selenium can vaporize at a temperature lower than the immobilized selenium.

An immobilized selenium system or body may comprise immobilized selenium that is doped with one or more additional/other element(s) from Group 6 of the Periodic Table, such as, for example, sulfur and/or tellurium. The dopant level may range from as low as 100 ppm by weight to as high as 85% of the weight of the immobilized selenium system or body.

Figure 6:
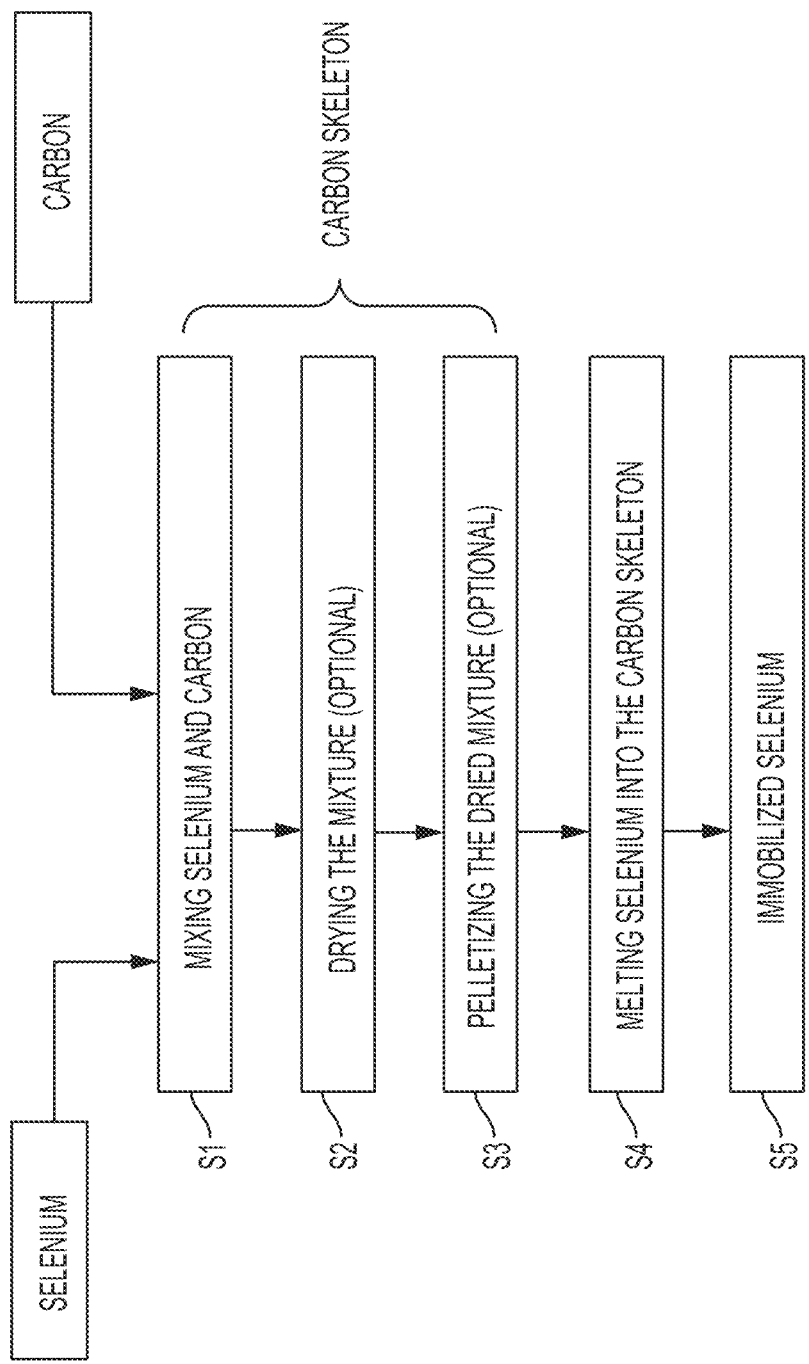
FIG. 6 is a flow diagram of a process of making immobilized selenium.

An example process of making immobilized selenium is illustrated in FIG. 6. In the process, selenium and carbon are mixed together (S1) under dry or wet conditions. The mixture can be optionally dried to a powder (S2) followed by optionally pelletizing the dried powder (S3). The results of step S1 and optionally steps S2 and S3 produce a carbon skeleton that is a starting material for step S4. In step S4, selenium is melted into the carbon skeleton. The selenium melted into the carbon skeleton is allowed to dry thereby producing the immobilized selenium of step S5. Preparation and characterization of immobilized selenium will be described later herein in connection with Example 10.

The immobilized selenium may be used as a cathode material for a rechargeable battery. For making a cathode, the immobilized selenium may be dispersed in a liquid media such as, but not limited to, water or an organic solvent. The cathode comprising the immobilized selenium may comprise a binder, optionally another binder, optionally an electric-conductivity promoter, and an electric charge collector. The binder may be an inorganic or organic. An organic binder may be of a natural product, such as, for example, CMC, or a synthetic product, such as, for example, a SBR Rubber latex. An electrical-conductivity promoter can be a type of carbon, such as, graphite-derived small particles, graphene, carbon nano-tubes, carbon nano-sheet, carbon blacks, etc. An electric charge collector may be, for example, an aluminum foil, a copper foil, a carbon foil, a carbon fabric, or other metallic foils. The cathode can be prepared by coating an immobilized selenium-containing slurry (or slurries) onto the charge collector, followed by a typical drying process (air dry, oven-dry, vacuum oven-dry, etc.). The immobilized selenium slurry or slurries may be prepared by a high shear mixer, a regular mixer, a planetary mixer, a double-planetary mixer, a ball mill, a vertical attritor, a horizontal mill, etc. The cathode comprising immobilized selenium may be pressed or roller-milled (or calendared) prior to its use in a battery assembly.

A rechargeable battery comprising immobilized selenium may comprise a cathode comprising immobilized selenium, an anode, a separator, and an electrolyte. The anode may comprise lithium, sodium, silicon, graphite, magnesium, tin, and/or and suitable and/or desirable element or combination of elements from Group IA, Group IIA, Group IIIA, etc., of the periodic table of the elements (Periodic Table). The separator may comprise an organic separator, an inorganic separator, or a solid electrolyte separator. An organic separator may comprise a polymer such as, for example, polyethylene, polypropylene, polyester, a halogenated polymer, a polyether, a polyketone, etc. An inorganic separator may comprise a glass or quartz fiber, a solid electrolyte separator. An electrolyte may comprise a lithium salt, a sodium salt, or other salt, a salt of Group 1A of the Periodic Table, a salt of Group IIA of the Periodic Table, and an organic solvent. The organic solvent may comprise an organic carbonate compound, an ether, an alcohol, an ester, a hydrocarbon, a halogenated hydrocarbon, a lithium containing-solvent, etc.

A rechargeable battery comprising immobilized selenium may be used for electronics, an electric or hybrid vehicle, an industrial application, a military application such as a drone, an aerospace application, a marine application, etc.

A rechargeable battery comprising immobilized selenium may have a specific capacity of 400 mAh/g active amount of selenium or higher, 450 mAh/g or higher, 500 mAh/g or higher, 550 mAh/g or higher, or 600 mAh/g or higher. A rechargeable battery comprising immobilized selenium may be able to undergo electrochemical cycling for 50 cycle or more, 75 cycles or more, 100 cycles or more, 200 cycles or more, etc.

A rechargeable battery comprising immobilized selenium may be able to be charged at 0.1C, 0.2C, 0.5C, 1C, 1.5 C, 2C, 3C, 4C, 5C, 6C, 7C, 8C, 9C, 10C or faster. After conducting extensive high C-Rate charge-discharge cycling for 30 or more cycles (e.g., 5 cycles at 0.1C, 5 cycles at 0.2C, 5 cycles at 0.5C, 5 cycles at 1C, 5 cycles at 2C, 5 cycles at 5C, and 5 cycles at 10C), a rechargeable battery comprising immobilized selenium may retain a battery specific capacity >30%, >40%, >50%, >60%, >70%, >80% of the $2^{nd}$ discharge specific capacity at a cycling rate of 0.1C.

Following are several examples to illustrate the spirit of the inventions. However, these examples should not be construed in a limiting sense.

Examples

Method of Characterization

Scanning Electron Microscopy (SEM) images were collected on a Tescan Vega scanning electron microscope equipped with an energy dispersive analysis X-Ray (EDX) detector.

Raman spectra were collected by a Renishaw inVia Raman Microscope (confocal). Laser Raman spectroscopy is widely used as a standard for the characterization of carbon and diamond and provides readily distinguishable signatures of each of the different forms (allotropes) of carbon (e.g., diamond, graphite, buckyballs, etc.). Combined with photoluminescence (PL) technology, it offers a non-destructive way to study various properties of diamond including phase purity, crystal size and orientation, defect level and structure, impurity type and concentration, and stress and strain. In particular, the width (full-width-half-maximum, FWHM) of the first order diamond Raman peak at 1332 $cm^{-1}$, as well as the Raman intensity ratio between diamond peak and graphitic peaks (D-band at 1350 $cm^{-1}$ and G-band at 1600 $cm^{-1}$), is a direct indicator of diamond and other carbon material quality. Furthermore, the stress and strain levels in diamond or other carbon grains and films can be estimated from diamond Raman peak shift. It has been reported that the diamond Raman peak shift rate under hydrostatic stress is about 3.2 $cm^{-1}$/GPa, with the peak shifting to lower wavenumber under tensile stress and higher wavenumber under compressive stress. The Raman spectra discussed herein were collected using a Renishaw inVia Raman spectroscope with 514 nm excitation laser. More information about using Raman spectroscopy to characterize diamond is also available in the references (1) A. M. Zaitsev, *Optical Properties of Diamond*, 2001, Springer and (2) S. Prawer, R. J. Nemanich, *Phil. Trans. R. Soc. Lond.* A (2004) 362, 2537-2565.

The data for BET surface area and pore size distributions of carbon samples were measured by nitrogen absorption and $CO_2$ absorption with a 3Flex (Mircomeritics) equipped with a Smart VacPrep for sample degas preparations. The sample is typically degased in Smart Vac-Prep at 250° C. for 2 hours under vacuum prior to $CO_2$ and $N_2$ absorption measurements. Nitrogen absorption is used to determine the BET surface area. Nitrogen absorption data and $CO_2$ absorption data were combined to calculate pore size distributions of a carbon sample. For the details about combining both $N_2$ and $CO_2$ absorption data for determining the pore size distributions for carbon materials, please refer to "Dual gas analysis of microporous carbon using 2D-NLDFT heterogeneous surface model and combined adsorption data of $N_2$ and $CO_2$", Jacek Jagiello, Conchi Ania, Jose B. Parra, and Cameron Cook, Carbon 91, 2015, page 330-337.

The data for thermogravimetric analysis (TGA) and TGA-differential scanning calorimetry (DSC) for immobilized selenium samples and the control samples were measured by Netzsch Thermal Analyzer. The TGA analysis was performed under an argon flow rate of ~200 mL/min at a heating rate of 16° C./min, 10° C./min, 5° C./min, 2° C./min, 1° C./min, and other heating rates. For the purpose of consistency, a typical amount of immobilized selenium sample used for TGA analysis was about 20 mg.

Activation energy and collision frequency of the immobilized selenium and non-immobilized selenium were determined by TGA following the procedures described in ASTM Method E1641-16.

X-Ray diffraction results for different carbon, Se-carbon samples, and immobilized selenium were collected on a Philip Diffractometer.

Battery cycling performances for rechargeable batteries comprising immobilized selenium were tested on Lanhe CT2001A Battery Cycling Tester. Charge and discharge currents of the rechargeable batteries comprising immobilized selenium were determined by the amount of selenium contained in the immobilized selenium and cycling rate (0.1C, 0.5C, 1C, 2C, 3C, 4C, 5C, 10C, etc.).

Example 9: Synthesis and Characterization of Carbon Skeleton

To form a first residue, a charge of 260 g potassium citrate was included in a crucible and the crucible was placed into a quartz tubing inside a tubular furnace. A stream of argon gas was flowed into the furnace and the furnace was heated at 5° C./min from room temperature (~20-22° C.) to 600° C. The furnace was held at this temperature for 60 minutes, followed by shutting-down the furnaces and removing the charge from the crucible after furnace cooling down, recovering 174.10 grams of processed residue. To form second and third processed residues, the same process described for the first residue was repeated for charges of 420 and 974 grams of potassium citrate, separately. The resulting second and third processed residues weighed 282.83 grams and 651.93 grams, respectively.

1108.9 grams from these three processed residues were combined together into a crucible, which was placed into the quartz tubing inside the tubular furnace and a flow of argon gas was streamed into the furnace. The furnace was heated at 5° C./min to 800° C. The furnace was held at 800° C. for 1 hour. The furnace was allowed to cool whereupon the crucible was removed from the quartz tubing and thereafter 1085.74 grams of a first final residue were recovered.

Following the same procedure described in this Example (800° C.), a charge of 120 grams of potassium residues introduced into the furnace produced about 77 grams of a second final residue (800° C.).

The combination of the first and second final residues resulted in about 1,163 grams of a third final residue.

The 1,163 grams of third final residue was then mixed with 400 ml of water to form a slurry which was separated approximately equally into four two-liter beakers. The pH of each slurry was measured to be greater than 13. Next, a concentrated hydrochloric acid solution was added to each beaker with a violent evolution of carbon dioxide, which subsided at a pH less than about 5. More hydrochloric acid solution was added to obtain a pH of about 1.9. Then the slurries were filtered and washed to filter cakes that were dried in an oven at 120° C. for about 12 hours, followed by vacuum drying at 120° C. for 24 hours resulting in four carbon skeleton samples, a total of about 61.07 grams.

These carbon skeleton samples were characterized with SEM, XRD, Raman, BET/Pore-Size-Distributions. The SEM result for one carbon skeleton is shown FIG. 7. Surface morphologies of typical carbon skeleton particles that are prepared in the process described in this Example, had sheet-like morphologies with their sheet edges being interconnected with sample thickness between 500 nm and 100 nm, and the sample width (or length) being between 0.5 and 2 µm, therefore having an aspect ratio (defined as the ratio of the longest dimension of the sample width (or sheet length) to the sample thickness) ≥1, e.g., an aspect ratio ≥5 or greater, or an aspect ratio ≥10.

Figure 8:
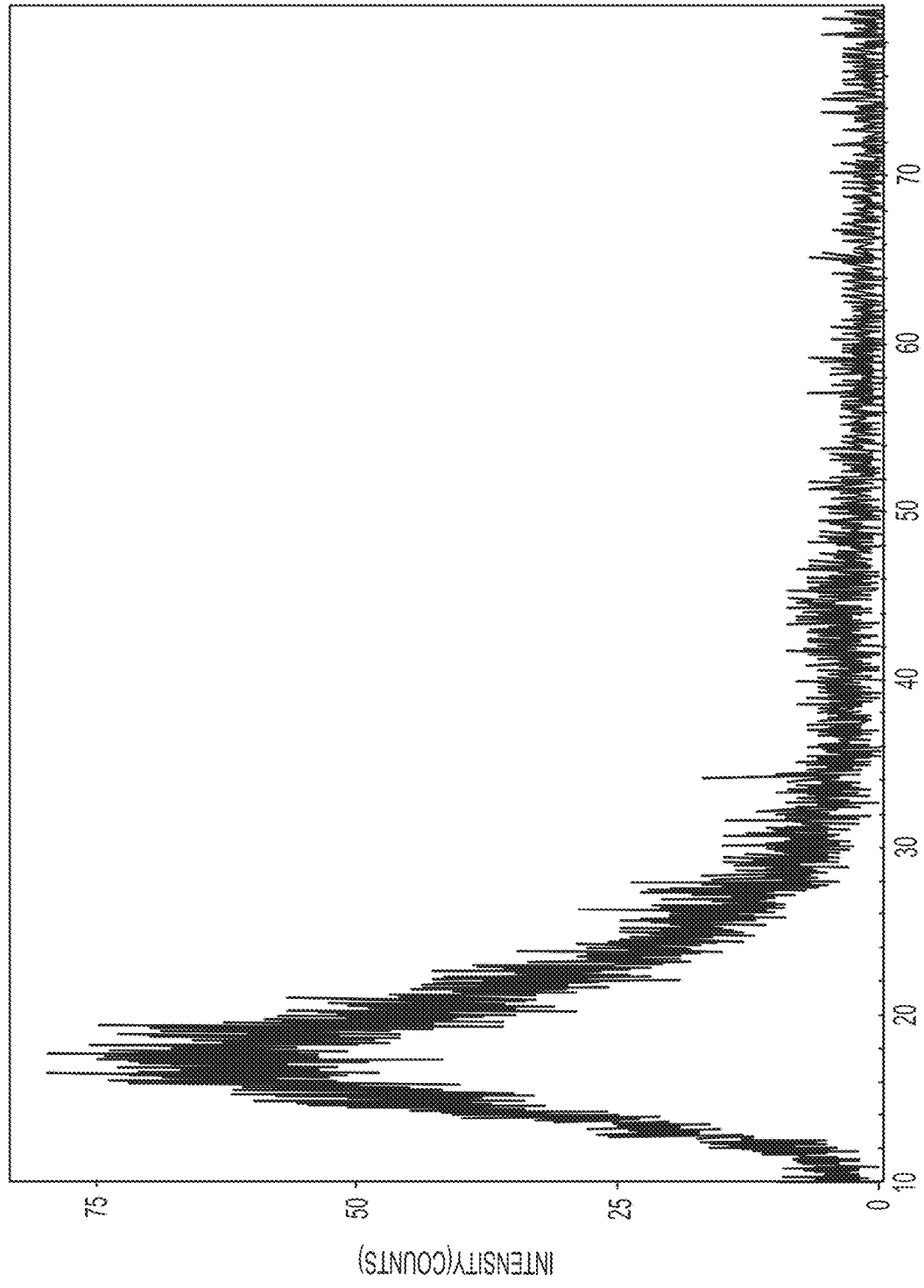
FIG. 8 is X-ray diffraction patterns for the carbon skeleton prepared by the process of Example 9.

X-Ray diffraction patterns of one carbon skeleton, shown in FIG. 8, shows that the carbon skeleton is substantially amorphous in phase. However, it does show a broad diffraction peak centered at around 2θ of about 17°, indicating a d-spacing about 5.21 angstroms.

Figure 9:
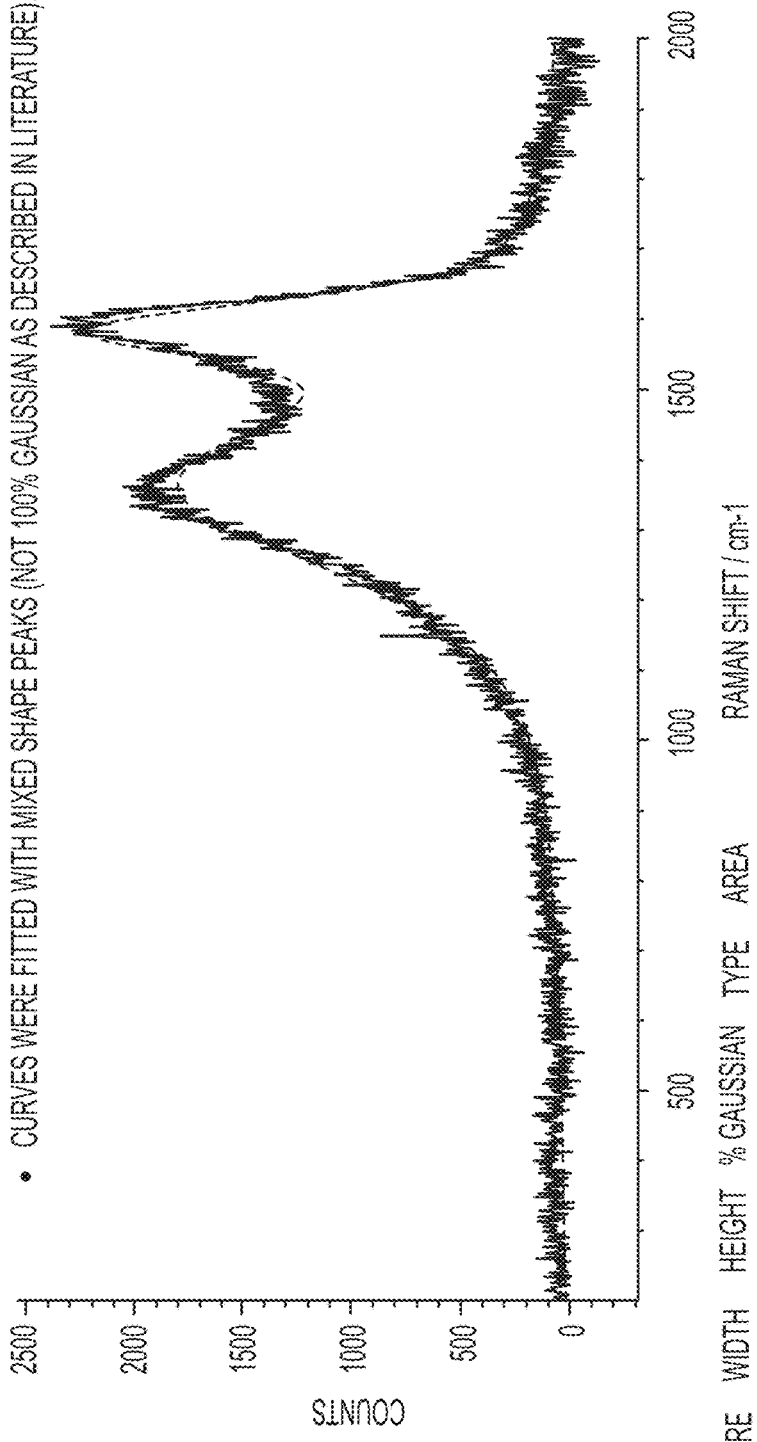
FIG. 9 is Raman spectrum of the carbon skeleton that was prepared by the process of Example 9.

Raman scattering spectroscopy results for one carbon skeleton is shown in FIG. 9, showing $Sp^2$ carbon having a D-band at about 1365 $cm^{-1}$ (Curve 1) and G-band at about 1589 $cm^{-1}$ (Curve 2) with a FWHM of 296 and 96 $cm^{-1}$, respectively. Both D-band and G-band show a mixture of Gaussian and Lorentian distributions; D-band has about 33% Gaussian distributions and G-band has about 61% Gaussian distributions. The ratio of the area for D-band to the area for G-band is about 3.5.

Figure 10A:
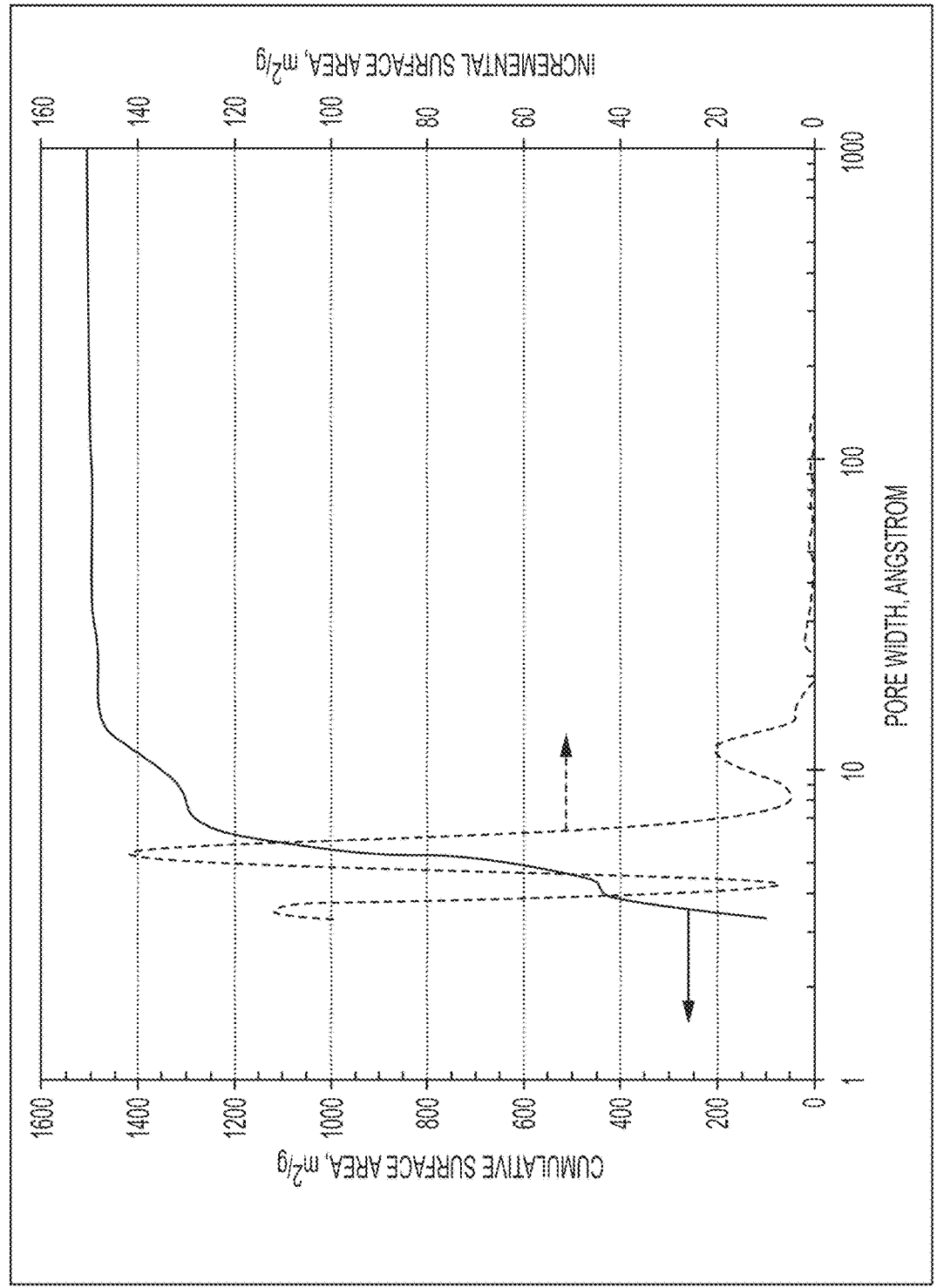
FIG. 10A is a graph of cumulative and incremental surface area for the carbon skeleton prepared by the process of Example 9.

BET surface area of one carbon skeleton was measured to be 1,205 $m^2/g$ by nitrogen absorption. The Incremental Pore Surface Area vs. the pore width is plotted in FIG. 10A by using NLDFT method, showing a Cumulative Pore Surface Area of 1,515 $m^2/g$. The discrepancy between BET surface area and NLDFT surface area may come from the fact that NLDFT distributions are calculated with both nitrogen and $CO_2$ absorption data; $CO_2$ molecules may enter the pores smaller than those pores that nitrogen molecules can enter. The NLDFT surface area in the pores peaked at 3.48 angstrom is 443 $m^2/g$, at 5.33 angstrom is 859 $m^2/g$, and at 11.86 angstrom (up to 20 angstroms) is 185 $m^2/g$, a total of 1,502 $m^2/g$ for the pores of 20 angstroms or smaller, while the NLDFT surface area from the pores between 20 angstrom and 1000 angstrom is only 7.5 $m^2/g$, and the surface area from the pores of 20 angstroms or greater is only about 0.5% of the total surface area.

Figure 10B:
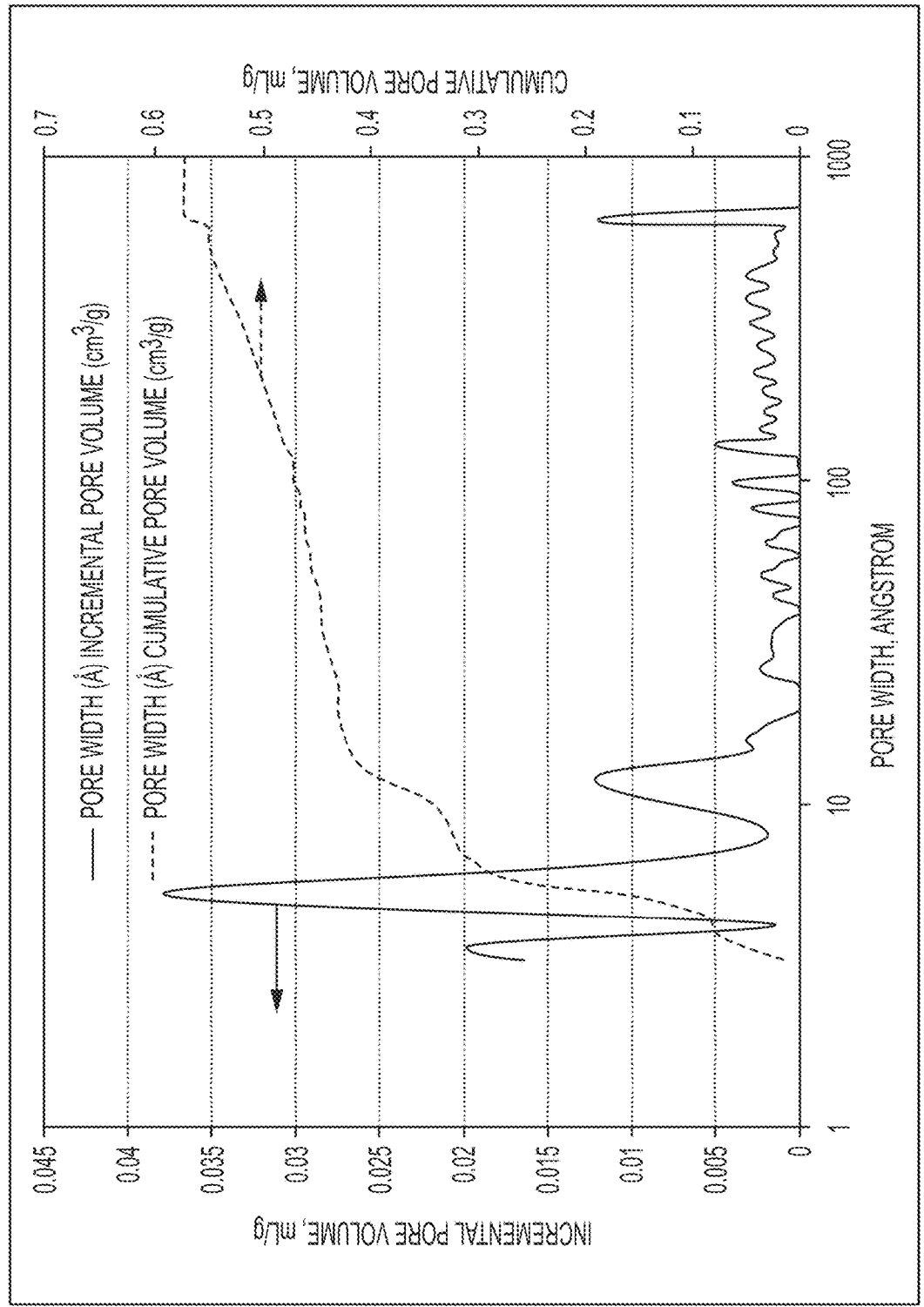
FIG. 10B is a graph of cumulative and incremental pour volumes for the carbon skeleton prepared by the process of Example 9.

The pore size distributions of the carbon skeleton sample were determined by nitrogen absorption and $CO_2$ absorption. The absorption results from nitrogen absorption and $CO_2$ absorption were combined to produce the pore-size-distribution shown in FIG. 10B. The relationship of Incremental Pore Volume (mL/g) vs. the pore width (angstrom) shows that there are three major peaks located at 3.66 angstroms, 5.33 angstroms, and 11.86 angstroms; the relationship of the Cumulative Pore Volume (mL/g) vs. pore width (angstrom) shows that there are about 0.080 mL/g pores under the peak of 3.66 angstroms, about 0.240 mL/g pores under the peak of 5.33 angstroms, about 0.108 mL/g pores under the peak of 11.86 angstroms, having 0.43 mL/g pores of 20 angstroms or smaller, 0.042 mL/g pores between 20 and 100 angstroms, and a total of 0.572 mL/g pores of up to 1000 angstroms.

Example 10: Preparation and Characterization of Immobilized Selenium

Include 0.1206 grams of selenium (showing bulk properties of selenium) into a set of agate mortar and pestle and include 0.1206 grams of the carbon skeleton that was prepared in accordance with Example 9 into the same agate mortar and pestle. Manually grind the mixture of selenium and carbon skeleton for about 30 minutes and transfer the ground mixture of selenium and carbon skeleton into a stainless steel die (10 mm in diameter). Press the mixture in the die to a pressure of about 10 MPa to form a pellet of the mixture. Then, load the pellet into a sealed container in the presence of an inert environment (argon) and place the sealed container containing the pellet into an oven. Heat the oven including the sealed container containing the pellet to 240° C. (above the melting temperature of selenium) for, for example, 12 hours. Use, however, is envisioned of any combination of time and temperature, above the melting temperature of selenium, sufficient to cause the selenium and carbon to react, either partially or fully react, and form immobilized selenium having some or all of the features described in this application. Next, unload the pellet from the container after allowing the pellet to return to room temperature. The unloaded pellet is the immobilized selenium of this Example 10.

The immobilized selenium of this Example 10 was then characterized by TGA-DSC and TGA. TGA-DSC analysis results were collected for the immobilized selenium under a stream of 200 ml/min of argon gas at a heating rate of 10° C./min. There is no observable endothermic DSC peak at temperatures near the melting point of selenium (about 230° C.), indicating that the immobilized selenium of this Example 10 is different from the bulk-form of selenium molecules/atoms which should have a melting point at around 230° C. where there should be a endothermic peak.

An investigation revealed that the TGA-DSC data may not be reliable when the heating temperature reaches a point where selenium molecules start to escape from the TGA-DSC sample crucible (graphite or ceramics). To this end, gas phase selenium molecules (from the sample crucible) enter the argon carrier gas stream and appear to react with the TGA-DSC platinum sample holder, which distorts the actual TGA-DSC thermochemical behaviors. The released selenium molecules from sample crucible reacting with platinum sample holder, lead to a lower weight loss in this temperature region. The selenium-platinum composite in the platinum sample holder is then released into the gas phase when the heating temperature reaches a point that is beyond 800° C. A complete selenium release can occur at 1000° C. This investigation used up most of the immobilized selenium sample of this Example 10. Therefore, a new sample of the immobilized selenium (~16 grams) was prepared using the same process as was described in the earlier part of this Example 10.

Figure 11A:
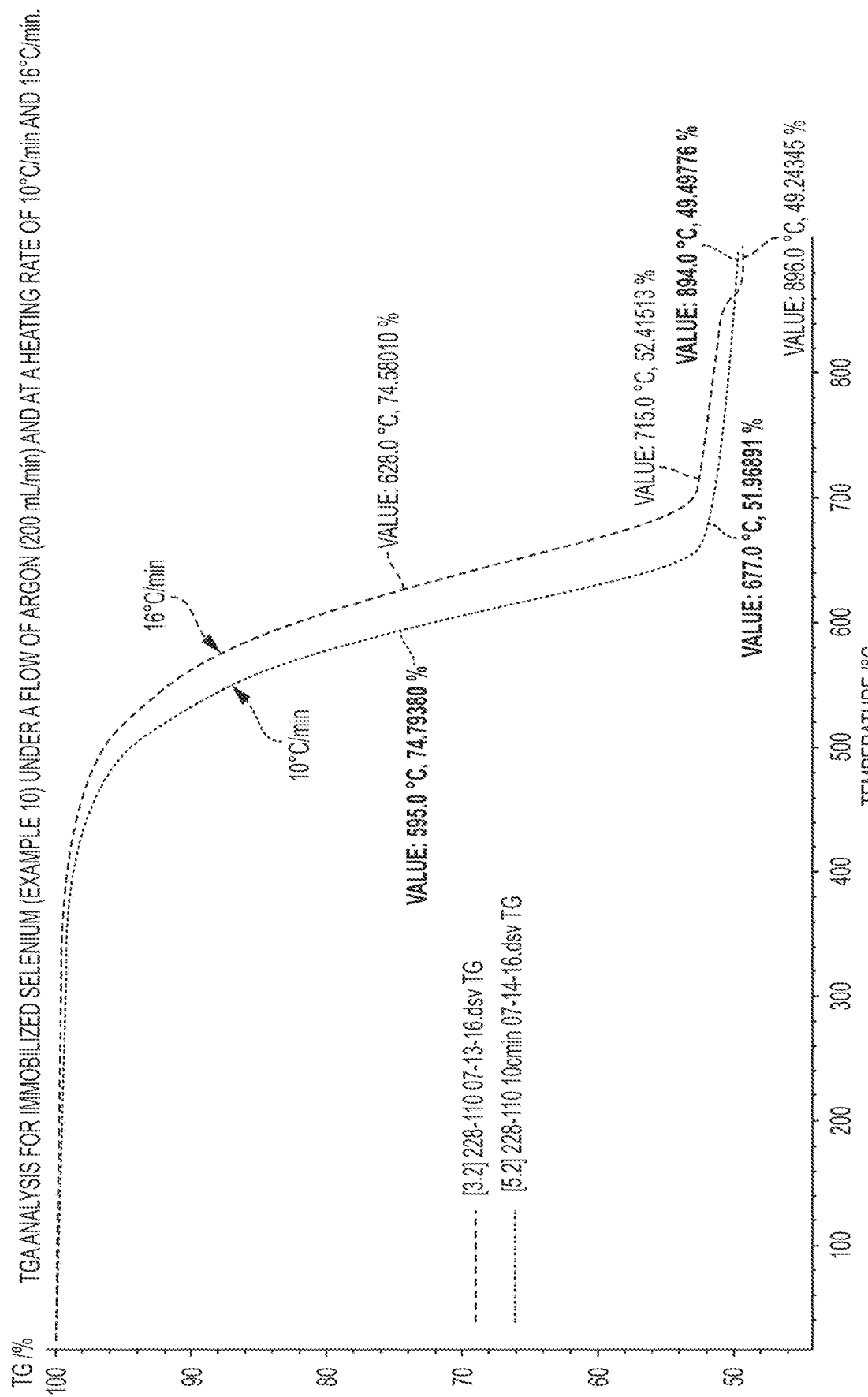
FIG. 11A is a graph of TGA analysis for the immobilized selenium that was prepared by the process of Example 10.
Figure 11B:
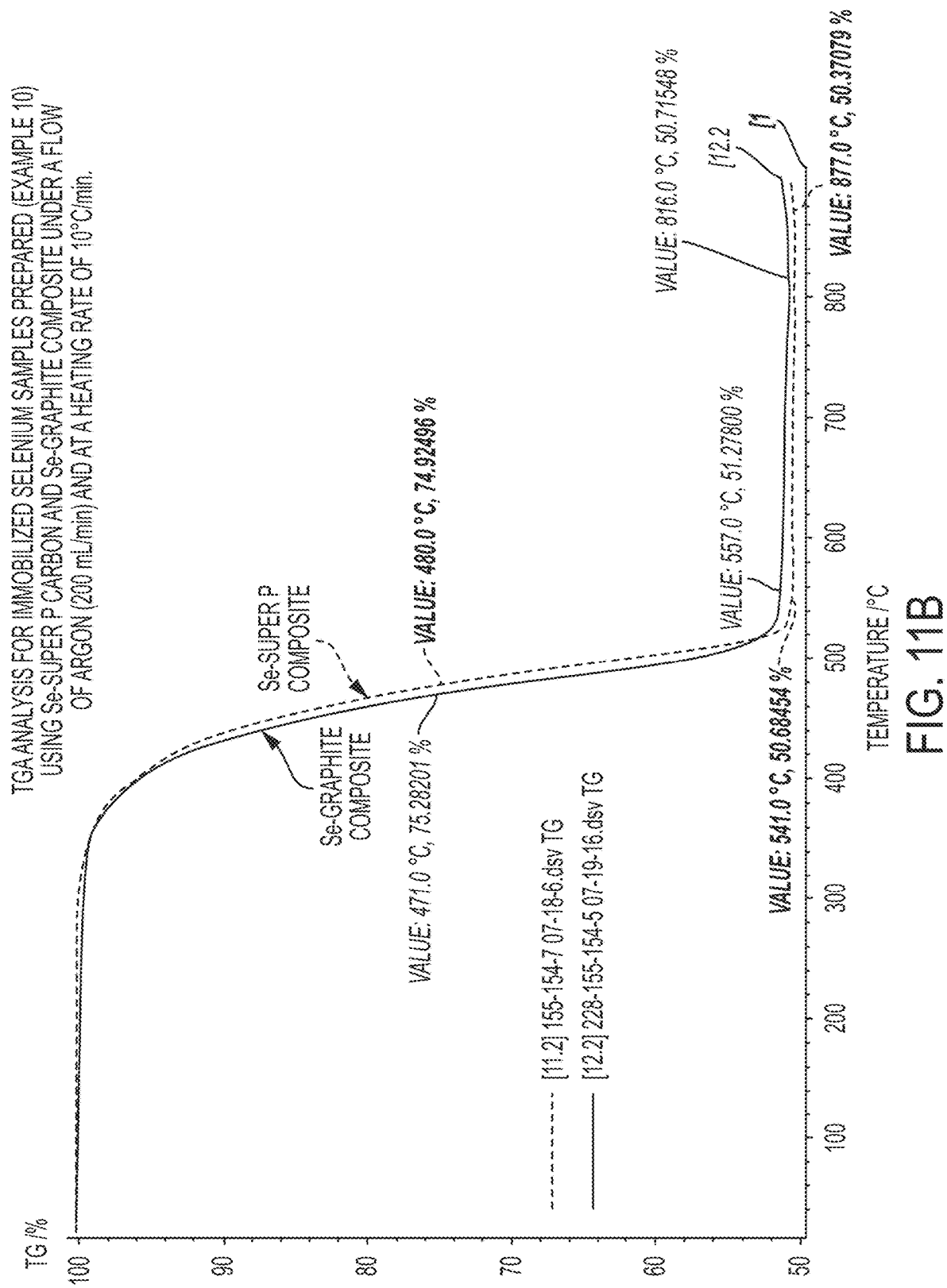
FIG. 11B is a graph of TGA analysis for non-immobilized selenium samples prepared by the process of Example 10 using Se-Super P carbon and Se-graphite.

The thermochemical behaviors of this new sample of immobilized selenium were studied by TGA analysis, which uses a ceramic sample holder that covers a very small thermocouple that is used for the TGA analysis. The TGA analysis results for this new immobilized selenium sample are shown in FIG. 11A along with the TGA analysis results (FIG. 11B) for selenium-carbon composites (made with 50-50 Se-Super P carbon composite, and Se-Graphite (ground graphite), in the same process as preparation of the immobilized selenium of this Example 10. Super P is a commercial grade carbon black widely used for lithium-ion battery industry. Ground graphite was prepared by grinding Poco 2020 graphite. The TGA analysis data are also summarized in the following Table 2.

TABLE 2

| | Immobilized Se in Example 10 | | | |
|---|---|---|---|---|
| | Se-Graphite Comp. | Se-Super P Comp. | Temp. at the bottom of the main wt. loss | End Temp. of TGA Expt. |
| | Mid-Weight-Loss Temperature | | | |
| Mid-Wt.-Loss Temp, ° C. | 471 | 480 | 595 | 660 | 1000 |
| Mid-Wt.-Loss Temp, K | 744 | 753 | 868 | 933 | 1273 |
| Kinetic Energy, Joule/Mole | 9,278 | 9,391 | 10,825 | 11,635 | 15,876 |

Immobilized selenium can have an initial weight loss temperature starting at about 400° C. vs. 340° C. for Se-Super P carbon composite and the Se-Graphite carbon composite; a mid-point weight-loss temperature for immobilized selenium can be at about 595° C. vs. 480° C. for the Se-Super P composite and 471° C. for Se-Graphite composite; and main weight loss completed at about 544° C. for Se-Super P composite and Se-Graphite composite, and 660° C. for the immobilized selenium. The Se-Super P carbon composite and Se-Graphite carbon composite show less than 0.6% weight loss between 560° C. and 780° C., while immobilized selenium shows a weight loss of about 2.5% from the bottom of the main weight loss (~660° C. to 1000° C.). These results suggest that non-immobilized selenium (Se-Super P carbon composite and Se-Graphite composite) has ≤1.2% of the total selenium which can escape from the composite at a temperature of ≥560° C., while the immobilized selenium has about 5.0% of the total selenium which can escape from carbon skeleton at a temperature of 660° C. The following details are provided to give examples that provide insight to the thermochemical behaviors. However, these details are not to be construed in a limiting sense.

Using the data of TGA mid-weight-loss temperature as examples of thermochemical behaviors, as the heating temperature increases, the kinetic energy of the selenium molecules in Se-Super P composite and Se-Graphite composite increase to a level at which these selenium molecules have enough energy to overcome the intermolecular interactions among selenium molecules and escape from liquid phase of the selenium. Herein Kinetic Energy=3RT/2, wherein: R is gas constant and T is temperature in Kelvin.

It was observed that the average kinetic energy of selenium molecules for Se-Super P composite was measured to be 9,391 joules/mole when the selenium molecules escape from the mixture of Se-Super P composite. However, the immobilized selenium needs to gain more energy to have an average kinetic energy of about 10,825 joules/mole for selenium to leave the carbon skeleton to gas phase selenium molecules. It is believed that the selenium in immobilized selenium, either as an atomic form, as a molecular form, or as any form, may chemically interact with selenium and the carbon skeleton beyond intermolecular interactions of selenium. In addition, the last portion of selenium that escapes from the carbon skeleton between 660° C. to 1000° C. has an average kinetic energy in the range from 11,635 joules/mole to 15,876 joules/moles or more. This suggests that selenium in the immobilized selenium is more stable than the selenium in conventional selenium-carbon composites. The stabilized selenium in the immobilized selenium of this Example 10 enhances the ability of selenium, either as atomic forms, as molecular forms, or in any forms, to stay inside the carbon skeleton during electrochemical processes, such as during charge and discharge cycling of a rechargeable battery comprised of the immobilized selenium. In an example, this last portion of selenium can require a kinetic energy of 11,635 joules/mole (≥660° C.) to escape the carbon skeleton and may be critical for selenium immobilization and may work as interfacial material between carbon skeleton and the majority of the immobilized selenium molecules. The portion of interfacial selenium in the immobilized selenium may be ≥1.5%, ≥2.0%, ≥2.5%, or 3.0% of the total immobilized selenium.

Figure 11C:
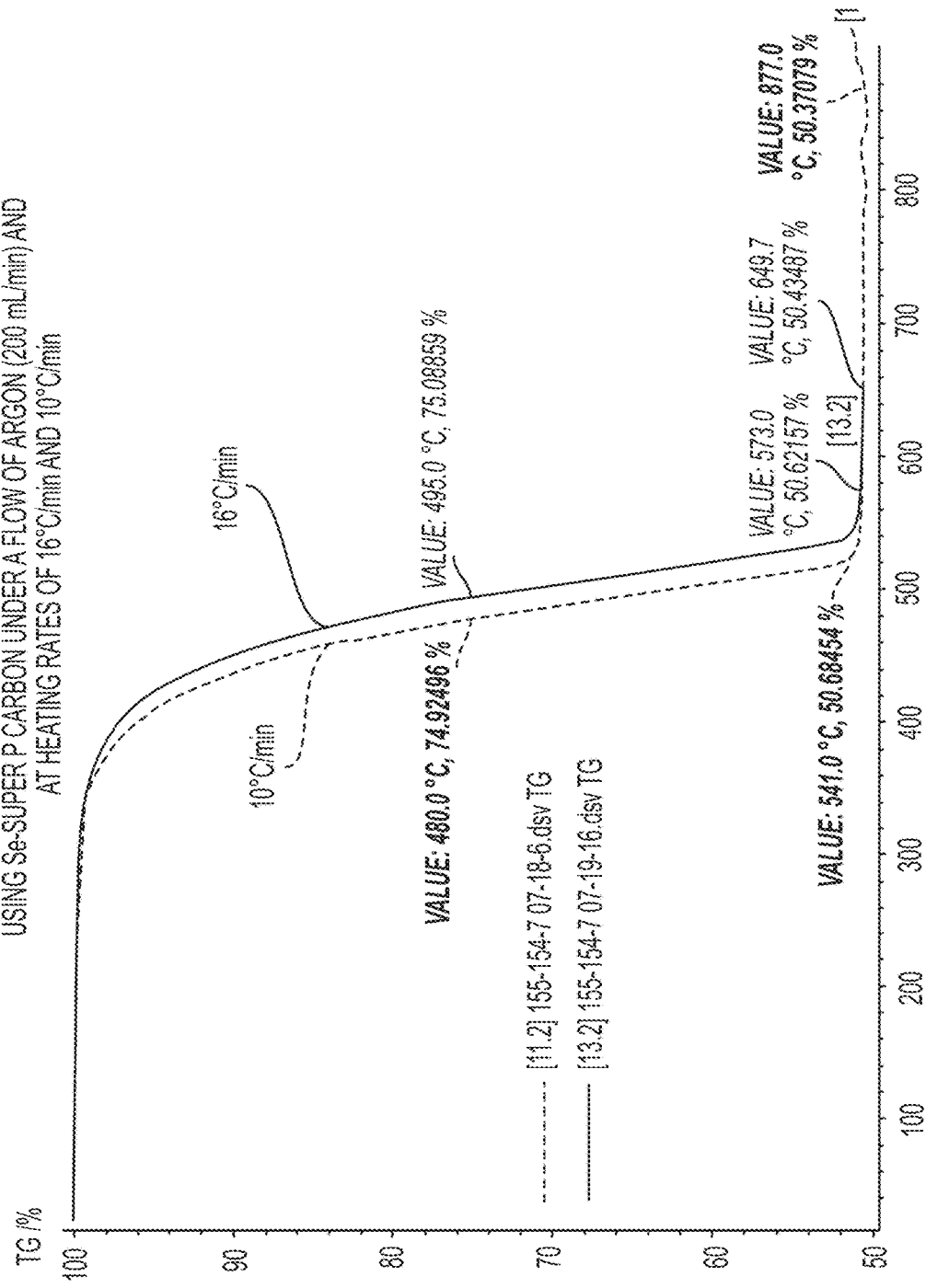
FIG. 11C is a graph of TGA analysis of the non-immobilized selenium sample prepared using the Se-Super P carbon (FIG. 11B) under a flow of argon gas and at heating rates of 16° C./min and 10° C./min.

FIG. 11A also shows the TGA studies of immobilized selenium with a heating rate of 16° C./min, having a temperature of 628° C. for the mid-point-weight-loss of the contained selenium. As shown in FIG. 11C, for Se-Super P composite, the temperature at the mid-weight-loss of the contained Se at a heating rate of 16° C./min is at 495° C. With different heating rates (e.g., 16° C./min, 10° C./min, 5° C./min, 2.5° C./min, and 1° C./min), activation energy and collision frequency may be determined and calculated using known methods, such as ASTM E1641-16 and E2958-14. The temperatures at 15% weight loss for different heating rates are tabulated as shown in the following Table 3.

TABLE 3

| | Temperature (° C.) | | |
|---|---|---|---|
| β (° C./min) | Immobilized Se prepared by the process of Example 10 (228-110) | Immobilized Se prepared by the process of Example 10 (155-82-2) | Se-Super P Composite |
| 16 | 590.65 | 570.13 | 471.08 |
| 10 | 560.82 | 544.86 | 456.61 |
| 5 | 535.57 | 515.09 | 413.37 |
| 2.5 | 506.66 | 493.27 | 397.21 |
| 1 | 478.48 | 462.18 | 365.02 |
| Activation Energy, kJ/mole | 120.7 | 120.0 | 92.3 |
| Frequency of Collisions | 12.4 × 10⁵ | 18.3 × 10⁵ | 2.27 × 10⁵ |

The activation energy for selenium (non-immobilized or conventional) in the Se-Super P composite was determined to be 92.3 kJ/mole with a frequency of collisions at $2.27 \times 10^5$. The activation energy for selenium in immobilized selenium (228-110 above) was also determined to be 120.7 kJ/mole with a frequency of collisions at $12.4 \times 10^5$. Another sample of immobilized selenium (155-82-2 above) that was prepared in the same procedures as Example 10 was also measured to have an activation energy of 120.0 kJ/mole and a frequency of collisions at $18.3 \times 10^5$.

The kinetic rate constant for selenium is calculated using the Arrhenius equation $$k = Ae^{-E_a/RT}$$

where k is the rate constant, $E_a$ is the activation energy, A is frequency of collisions, R is the gas constant, and T is the temperature in Kelvin.

Figure 11D:
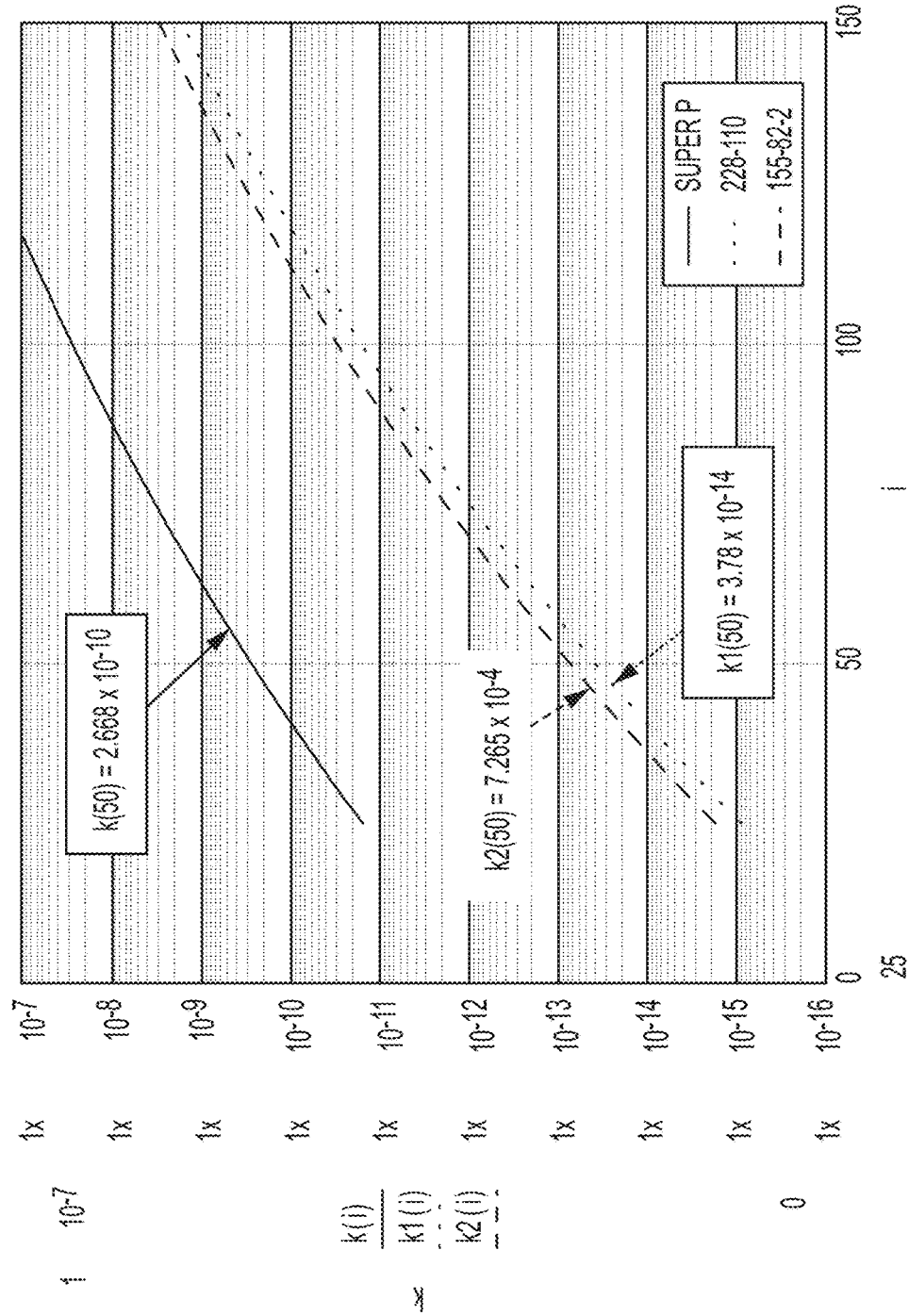
FIG. 11D is a graph of rate constants for non-immobilized selenium (Se-Super P composite-solid line), and 2 different samples of immobilized selenium (228-110 (dotted line) and 115-82-2 (dashed line)) prepared by the process of Example 10.

Referring to FIG. 11D, with above determined activation energy and collision frequency, the kinetic rate constant was calculated using the Arrhenius equation at different temperatures. FIG. 11D shows that non-immobilized selenium (Se-Super P composite-solid line) has much higher rate constant than that for immobilized selenium (228-110 (dotted line) and 115-82-2 (dashed line)), for example, about four orders of magnitude greater at 35° C. and about three orders of magnitude greater at 100° C. In an example, at 50° C., the rate constant for non-immobilized selenium (Super P) is $2.668 \times 10^{-10}$ while immobilized selenium has a rate constant at $7.26 \times 10^{-14}$ (155-82-2) and $3.78 \times 10^{-14}$ (228-110). Selenium that has a lower kinetic rate constant has less tendency to leave the host material (carbon), which may lead to better battery cycling performance.

Figure 12:
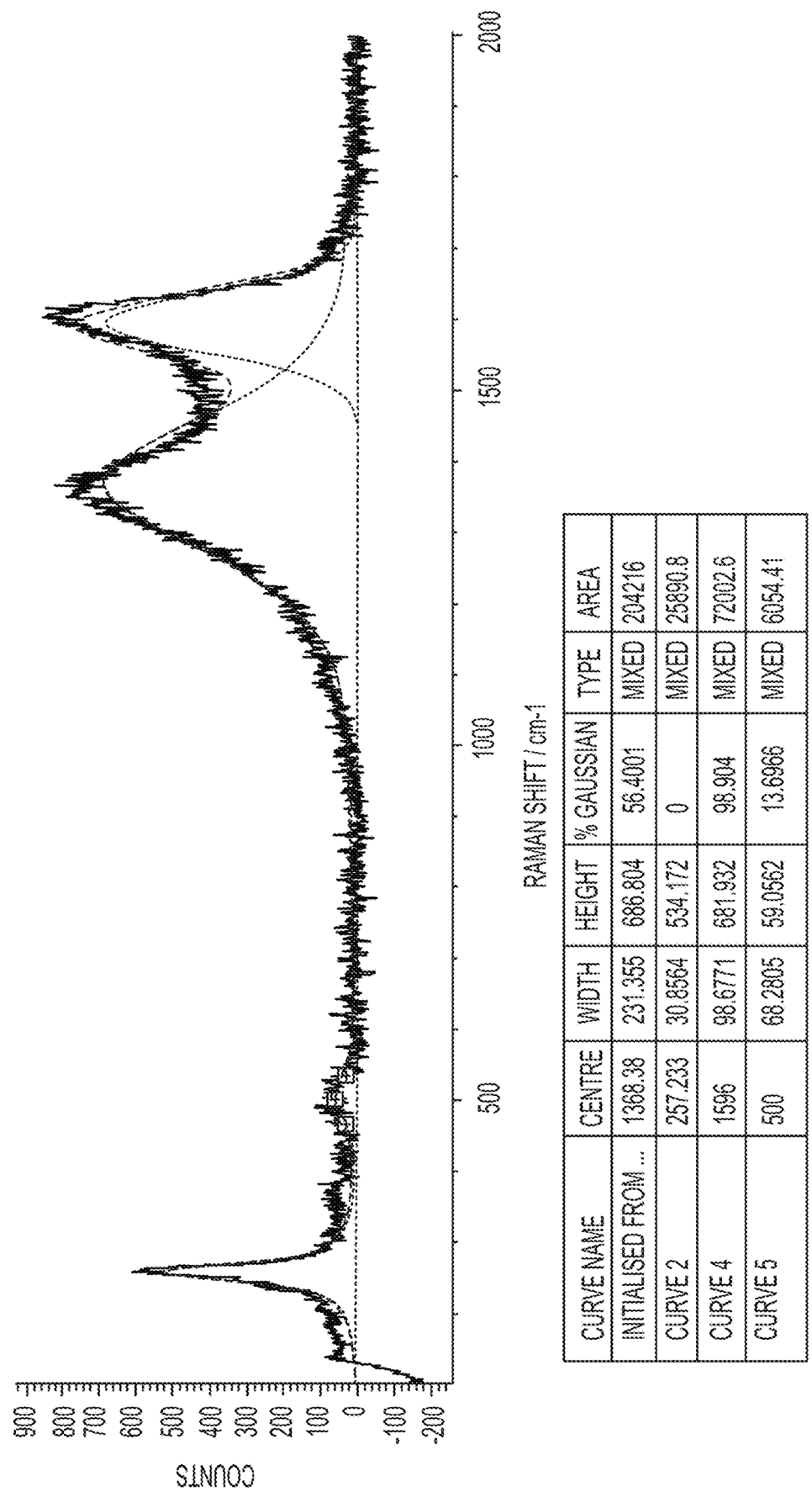
FIG. 12 is a graph of Raman spectrum of the immobilized selenium prepared by the process of Example 10.

FIG. 12 shows the spectrum of the immobilized selenium with Raman peaks of the D-band at 1368 $cm^{-1}$ and the G-band at 1596 $cm^{-1}$, having a ratio of the area for the D-band to the area for the G-band at 2.8. As compared to the Raman spectrum of the carbon skeleton shown in FIG. 9, selenium immobilization shifts both Raman peaks to a higher wavenumber, about 3 $cm^{-1}$ red shift for the D-band and 7 $cm^{-1}$ red shift for the G-band, which suggests that the bonding strength of $Sp^2$ carbon in the carbon skeleton is being strengthened, with a red shift of about 4 $cm^{-1}$ for the D-Band and a red shift of about 8 $cm^{-1}$ for the G-band. At the same time, the ratio of the area for the D-band to the area for the G-band was also decreased from about 3.4 to 2.8, suggesting that either the D-band gets relatively weaker or G-band gets relatively stronger. A stronger G-band may be desirable since the G-band can relate to a type of carbon that allows the carbon skeleton to more readily conduct electrons, which can be desirable for electrochemical performances when used in a rechargeable battery. Bulk or pure selenium typically shows a sharp Raman shift peak at about 235 $cm^{-1}$. For immobilized selenium, the Raman spectrum in FIG. 12 shows a broad Raman peak at about 257 $cm^{-1}$ (~12.7% of the G-band in area) and a new broad hump at about 500 $cm^{-1}$ (about 3.0% of the G-band area). It is believed that selenium immobilization changes Raman characteristics for both carbon skeleton and selenium, with all Raman peaks shifted to a higher wavenumber, suggesting that both of carbon-carbon $Sp^2$ bonds for the carbon skeleton and selenium-selenium bonds of the selenium are under compression.

The compression resulting from selenium immobilization strengthens both carbon-carbon $Sp^2$ bonds for carbon skeleton and Se—Se bonds for selenium, creating stronger selenium-selenium and carbon-selenium interactions. Therefore, more kinetic energy would be needed for selenium to overcome the stronger Se—Se bonding and stronger carbon-selenium interactions, which explains the observations in TGA analysis of the immobilized selenium vs. Se-Super P composite and Se-Graphite composite.

Furthermore, under compression, the carbon skeleton would then have a better capability of conducting electrons at the bonding level; and under compression, selenium atoms or molecules would also have better capability of conducting electrons.

Stabilized selenium for the immobilized selenium along with enhanced electron conductivity across the carbon skeleton and selenium can be desirable in electrochemical processes, such as, for example, improved specific capacity for the active material with a minimum level of shuttling, improved cycling capability due to the immobilization, a capability of being charged and discharged at a higher rate, etc. However, this is not to be construed in a limiting sense.

Figure 13:
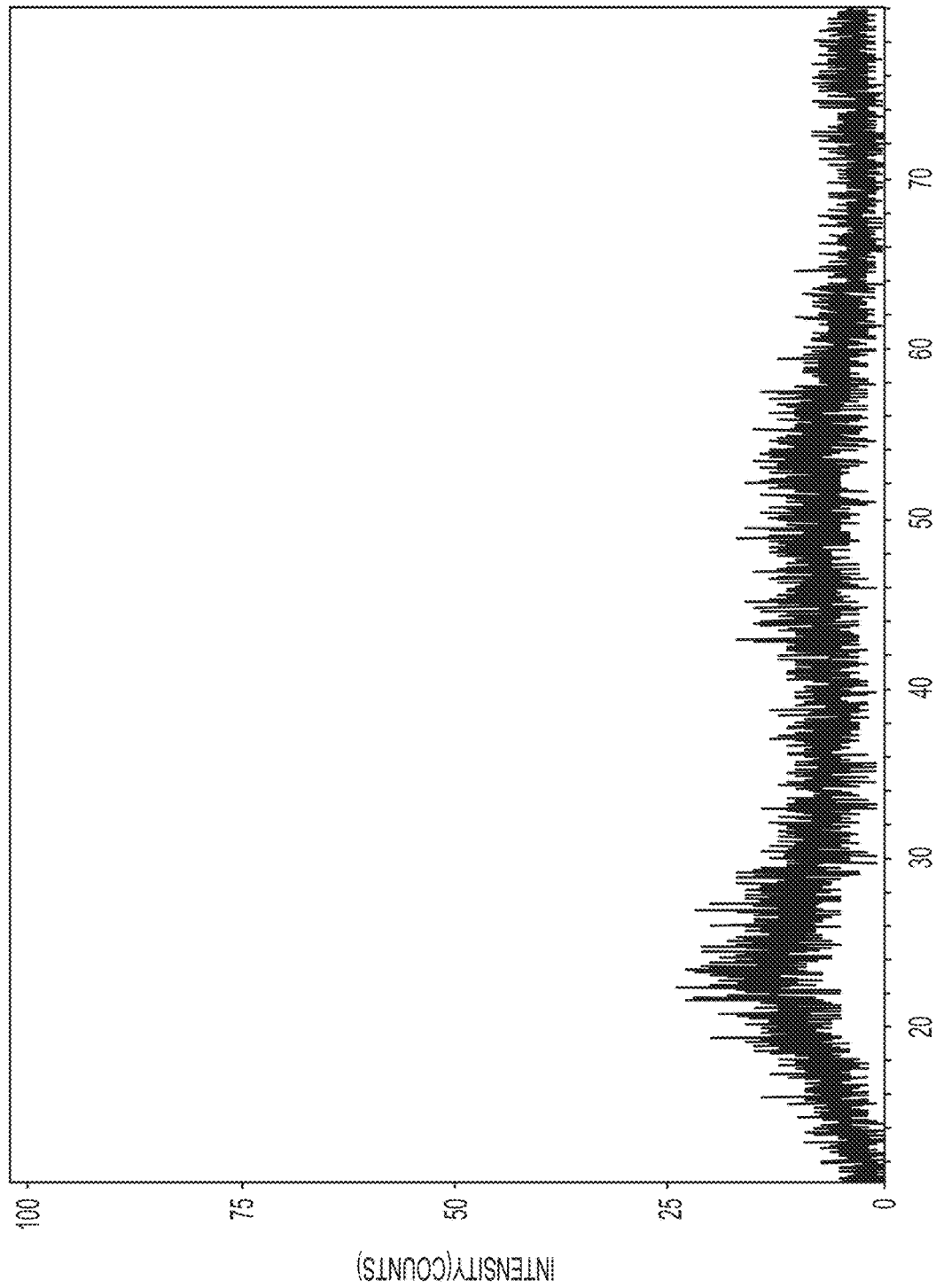
FIG. 13 is a graph of X-ray diffraction patterns for the immobilized selenium prepared by the process of Example 10.

X-ray diffraction patterns for the immobilized selenium prepared in accordance with Example 10, shown in FIG. 13, show a decrease in the intensity of the broad diffraction peak from the carbon skeleton with a d-spacing at about 5.21 angstroms—only about ⅓ the intensity, suggesting that immobilized selenium further makes the carbon skeleton more disordered, or causes more destruction to the order of the carbon skeleton. In an example, it is believed that this is because the compression forces are applied on the carbon-carbon $Sp^2$ bonds.

Figure 7:
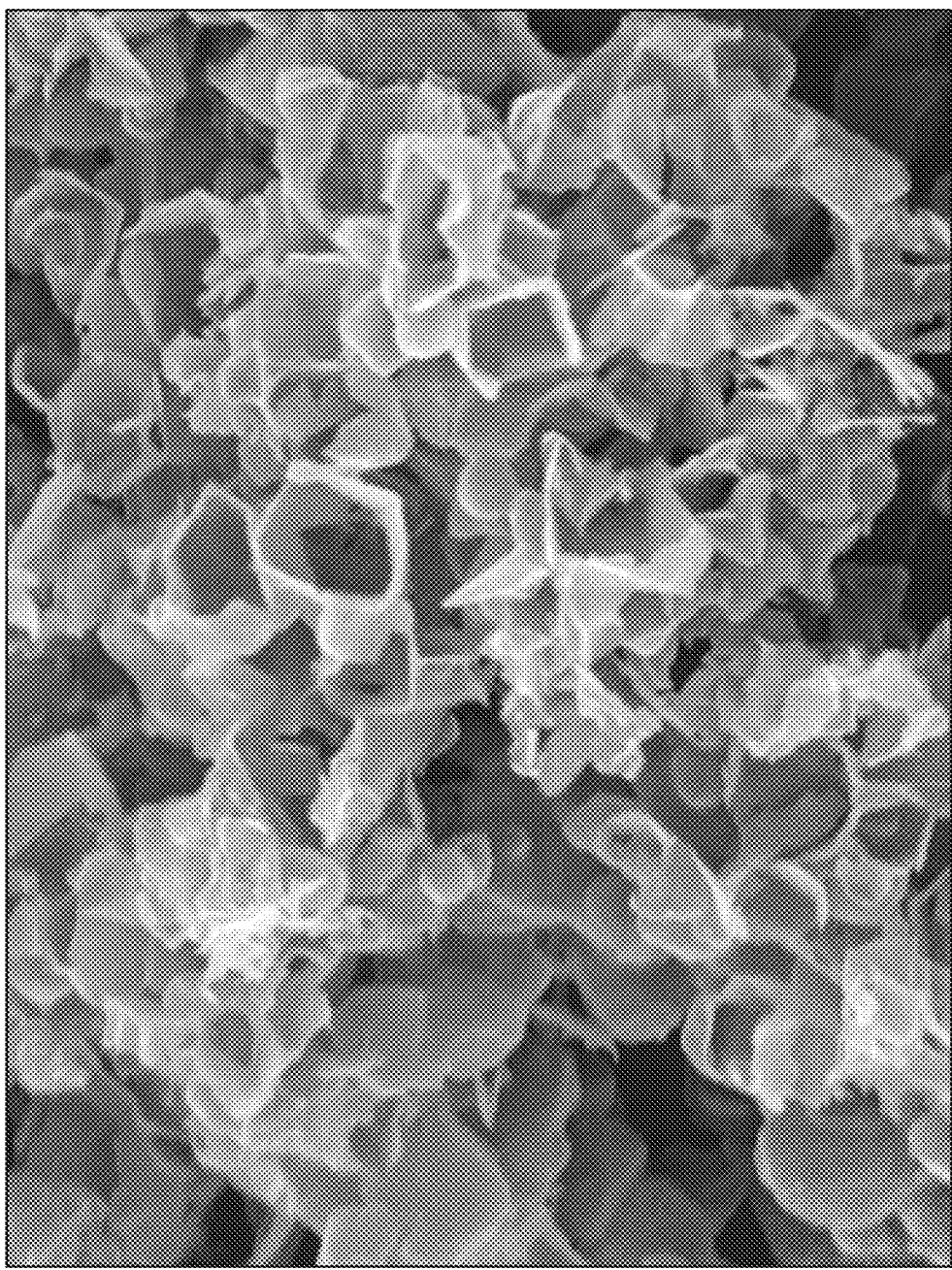
FIG. 7 is a scanning electron microscope image of a carbon skeleton prepared by the process of Example 9.
Figure 14:
FIG. 14 is an SEM image of the immobilized selenium prepared by the process of Example 10.

FIG. 14 shows SEM image for the immobilized selenium that was prepared in accordance with Example 10, showing sheet-like morphologies, just like the image in FIG. 7 for carbon skeleton. Though there is about 50% selenium that was immobilized in the carbon skeleton, there is no observable selenium particles on the surfaces of the carbon skeleton, except that the inter-sheet connections have been destroyed, resulting in many flat sheets having high aspect ratios. These sheet-like morphologies can be highly desirable for forming oriented coating aligned along the flat-sheet directions, creating sheet surface to surface contacts, leading to improved inter-sheet electrical conductivity, which may result in superior electrical performance for electrochemical processes, such as in a rechargeable battery.

Example 11: Se Cathode Preparation

Into a mortar and pestle include 56 mg of the immobilized selenium that was prepared in accordance with Example 10; 7.04 mg of Super P; 182 μL of carboxymethyl cellulose (CMC) solution (which includes 1 mg of dry CMC for every 52 μL of CMC solution); 21.126 μL of SBR Latex dispersion (which contains 1 mg dry SBR Latex for every 6.036 μL SBR Latex dispersion); and 200 μL deionized water. Grind the particles, the binders, and water manually into a slurry for 30 minutes to produce a cathode slurry. The cathode slurry was then coated onto one-side of a piece of an electrically conductive substrate, e.g., a foil, and air-dried. In an example, the conductive substrate or foil can be an aluminum (Al) foil. However this is not to be construed in a limiting sense since use of any suitable and/or desirable electrically conductive material of any shape or form, is envisioned. For the purpose of description only, the use of Al foil to form a selenium cathode will be described herein. However this is not to be construed in a limiting sense.

The slurry coated Al foil was then placed into a drying oven and heated to a temperature of 55° C. for 12 hours, resulting in a selenium cathode comprised of a dried sheet of immobilized selenium on one side of the Al foil, with the other side of the Al foil being uncoated, i.e., bare aluminum.

The selenium cathode was then punched to cathode discs, each having a diameter of 10 mm Some of these cathode discs were used as cathodes for rechargeable batteries.

Example 12: Li—Se Rechargeable Battery Assembly and Testing

Figure 15:
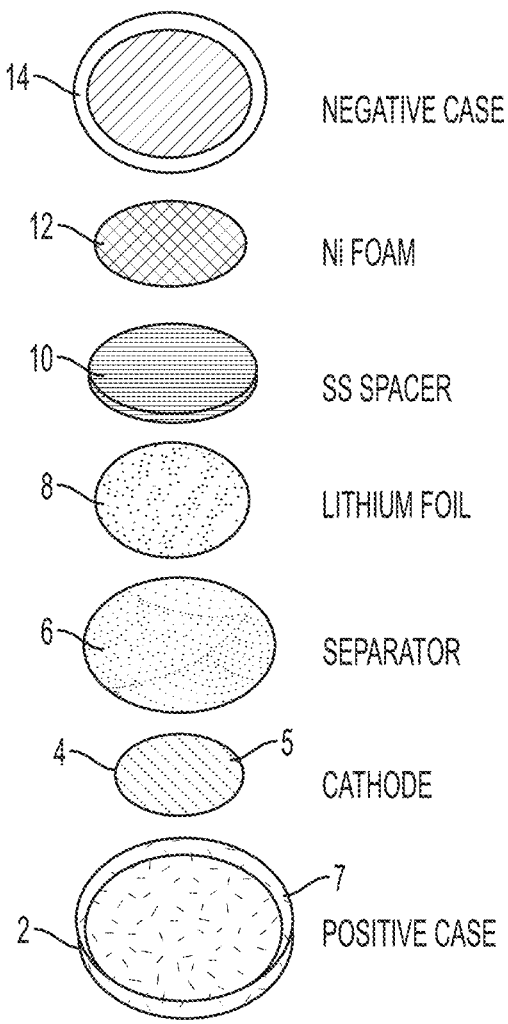
FIG. 15 is an exploded view of a coin cell battery including a cathode prepared according to the process of Example 11 or Example 13.

The cathode discs from Example 11 were used to assemble Li—Se rechargeable coil cell batteries in the manner described in the example discussed next and shown in FIG. 15. In this example, a 10 mm diameter cathode disc 4 from Example 11 was placed onto a base 2 of a 2032 stainless steel coin cell can which functions as the positive case of the coin cell (the "positive case" in FIG. 15) with the immobilized selenium sheet 5 facing upward, away from base 2 of the positive case and with the bare Al side facing and in-contact with the base 2 of the positive case. Next, a battery separator 6 (19 mm in diameter and 25 microns in thickness) was placed on top of the cathode disc 4 in contact with the immobilized selenium sheet 5. In an example, the battery separator 6 can be an organic separator, or an inorganic separator, or a solid electrolyte separator. The organic separator can be a polymer, for example, polyethylene, polypropylene, polyester, a halogenated polymer, a polyether, a polyketone, etc. The inorganic separator can be made from glass and/or quartz fiber.

Next, 240 μL of electrolyte 7 comprising $LiPF_6$ (1M) in ethylene carbonate (EC) and dimethyl carbonate (DMC) solvent (50-50 in weight) was introduced into the positive case 2 followed by placing a lithium foil disc 8 (15.6 mm in diameter and 250 microns in thickness) on a side of the separator 6 opposite the cathode disc 4. Next, a stainless steel (SS) spacer 10 was placed on a side of the lithium foil disc 8 opposite the separator 6 followed by placing one or more foam discs 12 made from, for example, nickel on a side of the SS spacer 10 opposite the lithium foil disc 8. The lithium foil 8, the SS spacer 10, and/or foam 12 disk can function as an anode. Finally, a case 14 made from 2032 stainless steel 14, to function as the negative of the coin cell (the "negative case" in FIG. 15), was placed on a side of the nickel foam disk(s) 12 opposite the SS spacer 10 and on the rim of the positive case 2. The positive case 2 and the negative case 14 were then sealed together under high pressure, e.g., 1,000 psi. The sealing of the positive and negative cases (2, 14) under high pressure also had the effect of compressing together the stack comprising (from bottom to top in FIG. 15) the cathode disc 4, separator 6, lithium foil 8, SS spacer 10, and Ni foam disc(s) 12. More than a dozen coin cell batteries were assembled using the battery separators described above and fiberglass separators. The assembled coil cell batteries were then tested under following conditions.

Some of the assembled coin cell batteries were tested under charge-discharge rates of 0.1C and 1C by using a Lanhe Battery Tester CT2001A. Each coin cell battery was tested: (1) rest for 1 hour; (2) discharge to 1V; (3) rest for 10 minutes; (4) charge to 3V; (5) rest for 10 minutes; repeat steps (2) to (5) for repeating cycling test.

Figure 16:
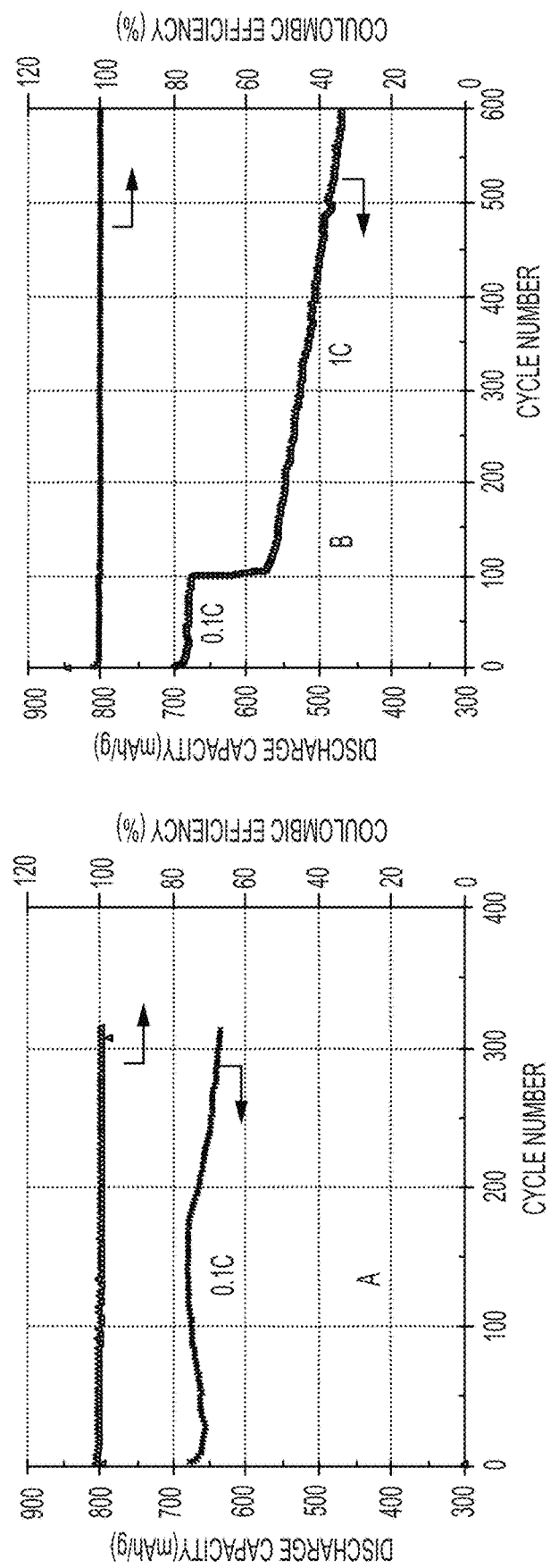
FIG. 16 are graphs of cycling test results for a first lithium-selenium coin cell battery (0.1C) (FIG. 16A—left) and a second lithium-selenium coin cell battery (0.1C and then 1C) (FIG. 16A—right) of the type shown in FIG. 15 that were prepared by the process of Example 12.

FIG. 16A (left) shows the cycling test results (313 cycles at a charge-discharge rate of 0.1C) for a coin cell made in accordance with Example 12 using the cathode prepared in accordance with Example 11, showing excellent cycling stability, having a specific capacity of 633.7 mAh/g after 313 cycles, which is a 93.4% retention of initial specific capacity. The first discharge specific capacity was higher than stoichiometric value, possibly due to some side reactions on the cathode and anode surfaces. From the second cycle on, the specific capacity decreased with cycling initially; however, the specific capacity increased slightly from about 30 cycles to about 120 cycles before staying stable to about 180 cycles and then decreasing. FIG. 16B (right) also shows excellent cycling stability (100 cycles at 0.1C and then 500 cycles at 1C) for another coin cell, having a specific capacity of 462.5 mAh/g at the $600^{th}$ cycle, which is a 66.0% retention of the $2^{nd}$ cycle capacity at 0.1C or a 80.3% retention of the $105^{th}$ cycle capacity at 1C. The Coulombic efficiency can be ≥95%, ≥98%, or as high as 100%, suggesting that there was no detectable amount of selenium being shuttled between cathode and anode. This electrochemical performance is believed to be the results of the immobilized selenium in the cathode, preventing selenium from being dissolved and shuttled from cathode 14 to anode 2.

Figure 17:
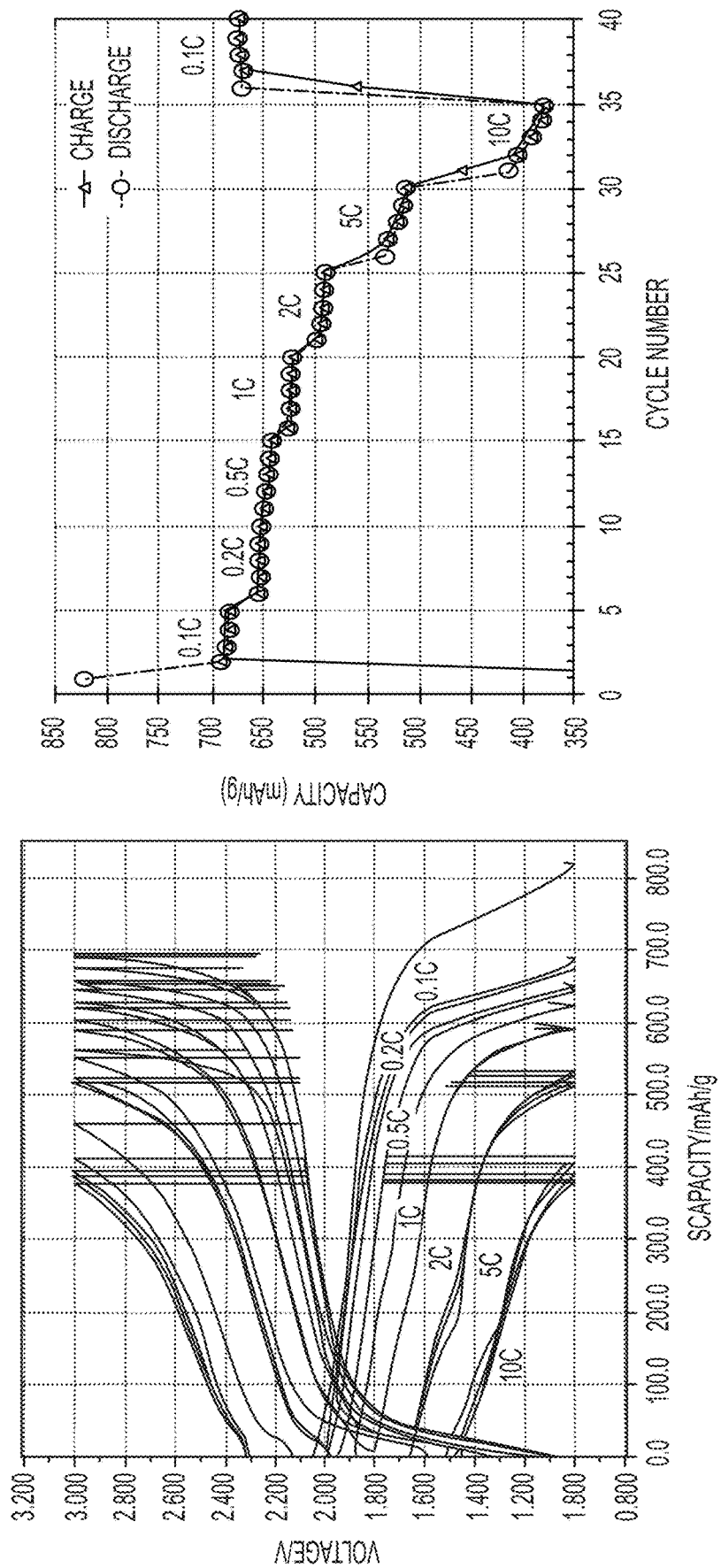
FIG. 17 are graphs of cycling tests for a lithium-selenium coin cell battery of the type shown in FIG. 15 that was prepared by the process of Example 12 at different cycling rates.

FIG. 17 shows cycling test results at different discharge-charge cycling rates (between 0.1C and 10C-rate) for coin cell that was assembled with a polymer separator described in Example 12. The testing protocols were similar to the tests described above except for the cycling rates (0.1C, 0.2C, 0.5C, 1C, 2C, 5C, and 10C); five cycles of charge and discharge were performed for each C-Rate; then the cycling rate was returned to 0.1C cycle. At the 0.1C rate, the battery exhibited a specific capacity around stoichiometric value. In addition, the battery exhibited good stability in cycling for cycling rates of 0.2C, 0.5C, 1C, and 2C. The battery also exhibited fast charging and discharging capability, cycled 56% of stoichiometric capacity at 10C-rate, though showing a declining specific capacity along cycling. In other words at the 10C-rate the battery took 3.3 minutes to charge and discharge to/from a capacity of 56% of the stoichiometric value. Under such fast cycling rate, a conventional battery would not be expected to survive.

The Li—Se battery comprising immobilized selenium can recover its specific capacity to 670 mAh/g, 98% of its full capacity when cycled at 0.1C-rate at the beginning of the test. It is believed that (1) the stabilization of selenium in the immobilized selenium cathode avoids selenium from leaving the carbon skeleton, avoiding the selenium from being shuttled between the cathode and anode during cycling, which enables the battery to have improved cycling performance; (2) both $Sp^2$ carbon-carbon bonds and carbon skeleton, selenium-selenium bonds, and carbon-selenium interactions may be under compression, possibly resulting in superior electrical conductivity within the carbon skeleton, within selenium particles, and among carbon and selenium interfaces, which may aid in achieving the observed cycling performance at high C-rates.

The immobilized selenium body comprising selenium and carbon prepared in accordance with the principles described herein can comprise one or more of the following features:

(a) a kinetic energy required for a selenium particle to escape the immobilized selenium can be ≥9.5 kJ/mole, ≥9.7 kJ/mole, ≥9.9 kJ/mole, ≥10.1 kJ/mole, ≥10.3 kJ/mole, or ≥10.5 kJ/mole;

(b) a temperature required for a selenium particle to escape the immobilized selenium can be can be ≥490° C., ≥500° C., ≥510° C., ≥520° C., ≥530° C., ≥540° C., ≥550° C., or ≥560° C.;

(c) the carbon can have a surface area (for pores less than 20 angstroms) ≥500 $m^2/g$, ≥600 $m^2/g$, ≥700 $m^2/g$, ≥800 $m^2/g$, ≥900 $m^2/g$, or ≥1,000 $m^2/g$;

(d) the carbon can have a surface area (for pores between 20 angstroms and 1000 angstroms) ≤20%, ≤15%, ≤10%, ≤5%, ≤3%, ≤2%, ≤1% of the total surface area;

(e) the carbon and/or selenium can be under compression. Benefits of the immobilized selenium where the carbon and/or selenium are under compression versus a carbon-selenium system where the carbon and/or selenium are not under compression can include: improved electron flow, reduced resistance to electron flow, or both, which can facilitate electron delivery to the selenium and from selenium anions during charging and discharging of a rechargeable battery that has a cathode comprised of the immobilized selenium;

(f) the immobilized selenium can comprise selenium that has an activation energy higher than the activation energy higher for conventional (non-immobilized) selenium in order for the selenium to escape from the immobilized Se—C composite system. In an example, the activation energy for non-immobilized selenium (Se-Super P composite system) was determined to be 92 kJ/mole, according to ASTM Method E1641-16. In contrast, in an example, the activation energy for selenium in the immobilized selenium comprising selenium and carbon can be ≥95 kJ/mole, ≥98 kJ/mole, ≥101 kJ/mole, ≥104 kJ/mole, ≥107 kJ/mole, or ≥110 kJ/mole. In another example, the activation energy for selenium in the immobilized selenium comprising selenium and carbon can be ≥3%, ≥6%, ≥9%, ≥12%, ≥15%, or ≥1.8% greater than that for selenium in Se-Super P composite;

(g) the immobilized selenium can comprise selenium that has higher collision frequency than non-immobilized selenium. In an example, the collision frequency for non-immobilized selenium was determined to be $2.27 \times 10^5$, according to the ATSM Method E1641-16. In contrast, in an example, the collision frequency for selenium in immobilized selenium, comprising selenium and carbon, can be is $\geq 2.5 \times 10^5$, $\geq 3.0 \times 10^5$, $\geq 3.5 \times 10^5$, $\geq 4.0 \times 10^5$, $\geq 4.5 \times 10^5$, $\geq 5.0 \times 10^5$, $\geq 5.5 \times 10^5$, $\geq 6.0 \times 10^5$, or $\geq 8.0 \times 10^5$. The immobilized selenium can have a collision frequency ≥10%, 30%, ≥50%, ≥80%, 100%, ≥130%, ≥150%, ≥180%, or ≥200% than for non-immobilized selenium in an Se—C composite; and (h) the immobilized selenium can comprise selenium that has a kinetic rate constant that is ≤1/5, ≤1/10, ≤1/50, ≤1/100, ≤1/500, or ≤1/1000 of the kinetic rate constant for non-immobilized/conventional selenium. In an example, the immobilized selenium can comprise selenium that has a kinetic rate constant (at 50° C.) of $\leq 1 \times 10^{-10}$, $\leq 5 \times 10^{-11}$, $\leq 1 \times 10^{-11}$, $\leq 5 \times 10^{-12}$, or $\leq 5 \times 10^{-13}$.

With the carbon and/or selenium of the immobilized selenium under compression, the D-band and/or the G-band of Raman spectrum for the $Sp^2$ C—C bonds of the carbon (or carbon skeleton defined by said carbon) of the immobilized selenium can show a red (positive) shift, e.g., by ≥1 $cm^{-1}$, ≥2 $cm^{-1}$, ≥3 $cm^{-1}$, ≥4 $cm^{-1}$, or ≥5 $cm^{-1}$ from a carbon feedstock.

With the carbon and/or selenium of the immobilized selenium under compression, the selenium can have a red (positive) shift from the Raman peak of pure selenium (235 $cm^{-1}$), e.g., by ≥4 $cm^{-1}$, ≥6 $cm^{-1}$, ≥8 $cm^{-1}$, ≥10 $cm^{-1}$, ≥12 $cm^{-1}$, ≥14 $cm^{-1}$, or ≥16 $cm^{-1}$, which red shift can suggest compression on the selenium particles.

The immobilized selenium can be an elemental form of selenium and/or a compound form selenium.

The immobilized selenium comprising selenium and carbon can be also doped with one or more additional element(s) from Group 6 of the Periodic Table (hereinafter, "additional G6 element(s)"), including, for example, without limitation, sulfur and/or tellurium. The dopant level may range from as low as 100 ppm by weight to as high as 85% of the total weight of the immobilized selenium. In an example, the immobilized selenium can comprise 15%-70% carbon and 30%-85% selenium and, optionally, additional G6 element(s). In an example, the immobilized selenium can comprise (1) 15%-70% carbon and (2) 30%-85% selenium+ additional G6 element(s) mixture. In the mixture comprising selenium+additional G6 element(s), the additional G6 element(s) can comprise between 0.1%-99% of the mixture and selenium can comprise between 1%-99.9% of the mixture. However, these ranges of selenium+additional G6 element(s) are not to be construed in a limiting sense.

The immobilized selenium can include ≥5% selenium, ≥10% selenium, ≥20% selenium, ≥30%, ≥40% selenium, ≥50% selenium, ≥60% selenium, or ≥70% or higher selenium.

The immobilized selenium can optionally including another element, such as, for example, sulfur, tellurium, etc.

The immobilized selenium can be Raman-inactive or Raman-active. If Raman-active, the immobilized selenium can have a Raman relative peak intensity at 255±25 $cm^1$, at 255±15 $cm^{-1}$, or at 255±10 $cm^{-1}$.

The immobilized selenium can comprise selenium having a Raman relative peak intensity of ≥0.1%, ≥0.5%, ≥1%, ≥3%, or ≥5%, herein, the Raman relative peak intensity is defined as the area of the Raman peak at 255 $cm^{-1}$ relative to the area of the D-band peak of the carbon Raman spectrum.

The carbon comprising the immobilized selenium can serve as a carbon skeleton for selenium immobilization. The carbon skeleton can have $Sp^2$-carbon-carbon bonds with a Raman D-band located at 1365±100 $cm^{-1}$ and G-band located at 1589±100 $cm^{-1}$; a D-band located at 1365±70 $cm^{-1}$ and a G-band located at 1589±70 $cm^{-1}$; a D-band located at 1365±50 $cm^{-1}$ and a G-band located at 1589±50 $cm^{-1}$; a D-band located at 1365±30 $cm^{-1}$ and a G-band located at 1589±30 $cm^{-1}$; or a D-band located at 1365±20 $cm^{-1}$ and a G-band located at 1589±20 $cm^{-1}$.

The carbon of the immobilized selenium can include $Sp^2$ carbon-carbon bonds, having Raman peaks featuring a D-band and a G-band. A ratio of the area of D-band to G-band can range from 0.01 to 100, from 0.1 to 50, or from 0.2 and 20.

The carbon of the immobilized selenium can include $Sp^2$ carbon-carbon bonds, having Raman peaks featuring a D-band and a G-band. Each of the D-band and the G-band can have a shift to a higher wavenumber ≥1 $cm^{-1}$, ≥2 $cm^{-1}$, or more.

The carbon of the immobilized selenium can be doped with one or more other elements in the period table.

The carbon of the immobilized selenium can be porous. The pore size distributions of the carbon skeleton can range between one angstrom to a few microns. The pore size distribution can have at least one peak located between one angstrom and 1000 angstroms, between one angstrom and 100 angstroms, between one angstrom and 50 angstroms, between one angstrom and 30 angstroms, or between one angstrom and 20 angstroms. The porosity of the carbon skeleton can have pore size distributions with more than one peak in the foregoing ranges.

The carbon of the immobilized selenium can include a pore volume between 0.01 mL/g and 5 mL/g; between 0.01 mL/g and 3 mL/g; between 0.03 mL/g and 2.5 mL/g; or between 0.05 mL/g and 2.0 mL/g.

The carbon of the immobilized selenium can include a pore volume (that has pore size <100 angstroms, <50 angstroms, <30 angstroms, or <20 angstroms) that can be >30%, >40%, >50%, >60%, >70%, or >80% of the total measurable pore volume.

The carbon of the immobilized selenium can include a surface area >400 $m^2/g$, >500 $m^2/g$, >600 $m^2/g$, >700 $m^2/g$, >800 $m^2/g$, >900 $m^2/g$, or >1000 $m^2/g$.

The carbon of the immobilized selenium can be amorphous and can have a broad peak centered at a d-spacing around 5.2 angstroms.

The carbon of the immobilized selenium can be of any morphology, platelet, sphere, fiber, needle, tubular, irregular, interconnected, agglomerated, discrete, or any solid particles. Platelet, fiber, needle, tubular, or some morphology having a certain level of aspect ratio may be beneficial for achieving better inter-particle contact, resulting in enhanced electrical conductivity (over immobilized selenium made from a different aspect ratio), which may be beneficial to an electrochemical cell, such as a rechargeable battery.

The carbon of the immobilized selenium can be of any particle size, having a median particle size between 1-9 nanometers and 2 millimeters, between 1-9 nanometers to <1000 microns, or between 20 nanometers to 100 microns.

The selenium of the immobilized selenium can be amorphous, e.g., as determined by X-ray diffraction. The diffraction peak of the selenium of the immobilized selenium, which can have a d-spacing about 5.2 angstroms may be weaker than the diffraction peak that for the carbon skeleton, e.g., 10% weaker, 20% weaker, 30% weaker, or 40% weaker.

In an example, a method of preparing the immobilized selenium can include:

(a) physical mixing carbon and selenium. The physical mixing can be by ball-milling (dry and wet), mixing with mortar and pestle (dry or wet), jet-milling, horizontal milling, attrition milling, high shear mixing in slurries, regular slurry mixing with blade, etc.;

(b) the physically mixed carbon and selenium of step (a) can be heated at the melting temperature of selenium or higher. The heating of the carbon and selenium mixture can occur in the presence of an inert gas environment such as, but not limited to, argon, helium, nitrogen, etc., or in an air or reactive environment;

(c) optionally homogenizing or blending the heated carbon and selenium to achieve selenium immobilization; and (d) cooling the immobilized selenium of step (c) to ambient or room temperature.

In another example, immobilized selenium can be prepared by dissolving selenium onto carbon followed by evaporation. The solvent for dissolving the selenium can be an alcohol, an ether, an ester, a ketone, a hydrocarbon, a halogenated hydrocarbon, a nitrogen-containing compound, a phosphorus containing compound, a sulfur-containing compound, water, etc.

In another example, the immobilized selenium can be prepared by melting selenium onto carbon, followed by removing extra or excess non-immobilized selenium.

In an example, a method of making the immobilized selenium can include:

(a) mixing selenium and carbon together under dry or wet conditions;

(b) optional drying the mixture of step (a) at an elevated temperature;

(c) optional pelletizing the dried mixture of step (b);

(d) melting the selenium into the carbon to produce the immobilized selenium.

Immobilized selenium can be used as a cathode material for a rechargeable battery. The cathode can include an inorganic or an organic binder. The inorganic binder can be a natural product, such as, for example, CMC, or a synthetic product, such as, for example, SBR Rubber latex. The cathode can include an optional electric-conductivity promoter, such as, for example, graphite-derived small particles, graphene, carbon nano-tubes, carbon nano-sheet, carbon blacks, etc. Finally, the cathode can include a charge collector such as, for example, an aluminum foil, a copper foil, a carbon foil, a carbon fabric, or other metallic foil.

The method of making the cathode can include coating an immobilized selenium-containing slurry onto the charge collector, followed by drying the slurry coated charge collector (e.g., air dry, oven-dry, vacuum oven-dry, etc.). The immobilized selenium can be dispersed into the slurry, which can be prepared by a high shear mixer, a regular mixer, a planetary mixer, a double-planetary mixer, a ball mill, a vertical attritor, a horizontal mill, etc. The slurry can then be coated onto the charge collector, followed by drying in air or in vacuum. The coated cathode can then be pressed or roller-milled (or calendared) prior to its use in a rechargeable battery.

A rechargeable battery can be made using the immobilized selenium described herein. The rechargeable battery can include a cathode comprising the immobilized selenium, an anode, and a separator separating the anode and the cathode. The anode, the cathode, and the separator can be immersed in an electrolyte, such as, for example, LiPF$_6$. The anode can be comprised of lithium, sodium, silicon, graphite, magnesium, tin, etc.

The separator can be comprised of an organic separator, an inorganic separator, or a solid electrolyte separator. The organic separator can comprise a polymer such as, for example, polyethylene, polypropylene, polyester, a halogenated polymer, a polyether, a polyketone, etc. The inorganic separator can comprise a glass or quartz fiber, or a solid electrolyte separator.

The electrolyte can comprise a lithium salt, a sodium salt, or other salt from Group IA, IIA, and IIIA, in an organic solvent. The organic solvent can comprise an organic carbonate compound, an ether, an alcohol, an ester, a hydrocarbon, a halogenated hydrocarbon, a lithium containing-solvent, etc.

The rechargeable battery can be used for electronics, an electric or hybrid vehicle, an industrial application, a military application, such as a drone, an aerospace application, a marine application, etc.

The rechargeable battery can have an electrochemical capacity of ≥400 mAh/g active amount of selenium, ≥450 mAh/g active amount of selenium, ≥500 mAh/g active amount of selenium, ≥550 mAh/g active amount of selenium, or ≥600 mAh/g active amount of selenium.

The rechargeable battery can undergo electrochemical cycling for ≥50 cycles, ≥75 cycles, ≥100 cycles, ≥200 cycles, etc.

The rechargeable battery can be charged and/or discharged at 0.1C, 0.2 C, 0.5C, 1C, 1.5 C, 2C, 3C, 4C, 5C, 6C, 7C, 8C, 9C, 10C or faster.

The rechargeable battery can retain a battery specific capacity >30%, >40%, >50%, >60%, >70%, or >80% of the $2^{nd}$ discharge specific capacity at a cycling rate of 0.1C after conducting high C-Rate charge-discharge cycling (5 cycles at 0.1C, 5 cycles at 0.2C, 5 cycles at 0.5C, 5 cycles at 1C, 5 cycles at 2C, 5 cycles at 5C, and 5 cycles at 10C).

The rechargeable battery can have a Coulombic efficiency ≥50%, ≥60%, ≥70%, ≥80%, ≥90%, or as high as around 100%.

Coloumbic efficiency of a battery is defined as follows:

$$\eta_c = \frac{Q_{out}}{Q_{in}}$$

Where $\eta_c$ is the Coloumbic efficiency (%)

$Q_{out}$ is the amount of charge that exits the battery during a discharge cycle.

$Q_{in}$ is the amount of charge that enters the battery during a charging cycle.

The rechargeable battery can be charged at C-rate of 0.1C, 0.2 C, 0.5C, 1C, 1.5 C, 2C, 3C, 4C, 5C, 6C, 7C, 8C, 9C, 10C or faster. A C-rate is a measure of the rate at which a battery is discharged relative to its maximum capacity. For example, a 1C rate means that the discharge current will discharge the entire battery in 1 hour. For example, for a battery with a capacity of 100 Amp-hrs, this equates to a discharge current of 100 Amps A 5C rate for this same battery would be 500 Amps, and a 0.5C rate would be 50 Amps.

The cathode of the rechargeable battery can comprise one or more elements of a chalcogen group such as selenium, sulfur, tellurium, and oxygen.

The anode of the rechargeable battery can comprise at least one element of alkali metal, alkali earth metals, and group IIIA metals.

The separator of the rechargeable battery can comprise an organic separator or an inorganic separator.

The electrolyte of the rechargeable battery can comprise at least one element of alkali metals, alkali earth metals, and Group IIIA metals; and a solvent of the electrolyte can comprise an organic solvent, carbonate-based, ether-based, or ester-based.

The rechargeable battery can have a specific capacity of ≥400 mAh/g, ≥450 mAh/g, ≥500 mAh/g, ≥550 mAh/g, or ≥600 mAh/g.

The rechargeable battery can undergo electrochemical cycling for ≥50 cycles, ≥75 cycles, ≥100 cycles, ≥200 cycles, etc.

The rechargeable battery can have a specific capacity >30%, >40%, >50%, >60%, >70%, or >80% of the 2nd discharge specific capacity at a cycling rate of 0.1C after conducting high C-Rate charge-discharge cycling (5 cycles at 0.1C, 5 cycles at 0.2C, 5 cycles at 0.5C, 5 cycles at 1C, 5 cycles at 2C, 5 cycles at 5C, and 5 cycles at 10C).

The rechargeable battery can have has a Coulombic efficiency ≥50%, ≥60%, ≥70%, ≥80%, or ≥90%.

Also disclosed is a composite comprising selenium and carbon, said composite can have a platelet morphology with an aspect ratio of ≥1, ≥2, ≥5, ≥10, or ≥20.

The selenium of the composite can be amorphous, e.g., as determined by X-ray diffraction. The diffraction peak of the selenium can have a d-spacing about 5.2 angstroms which may be weaker than that for a carbon skeleton, e.g., 10% weaker, 20% weaker, 30% weaker, or 40% weaker than the carbon skeleton.

In an example, the method of preparing the composite can include:

(a) physical mixing carbon and selenium. The physical mixing can be by ball-milling (dry and wet), mixing with mortar and pestle (dry or wet), jet-milling, horizontal milling, attrition milling, high shear mixing in slurries, regular slurry mixing with blade, etc.;

(b) the physically mixed carbon and selenium of step (a) can be heated to the melting temperature of selenium or higher and said heating can occur in the presence of an inert gas environment such as, for example, argon, helium, nitrogen, etc., or in an air or reactive environment; and (c) the heated carbon and selenium of step (b) can be homogenized or blended as an aid to achieving selenium immobilization.

In another example, the composite can be prepared by dissolving selenium onto carbon followed by evaporation. The solvent for dissolving the selenium can include an alcohol, an ether, an ester, a ketone, a hydrocarbon, a halogenated hydrocarbon, a nitrogen-containing compound, a phosphorus containing compound, a sulfur-containing compound, water, etc.

The composite can be prepared by melting selenium onto (or into) carbon, followed by removing extra or excess non-immobilized selenium.

In an example, a method of making the composite can include:

(a) mixing selenium and carbon together under dry or wet conditions;

(b) optional drying the mixture of step (a) at an elevated temperature;

(c) optional pelletizing the dried mixture of step (b);

(d) melting the selenium into the carbon to produce the immobilized selenium.

The composite can be used as a cathode material for a cathode of a rechargeable battery. The cathode can include an inorganic or an organic binder. The inorganic binder can be a natural product, such as, for example, CMC, or a synthetic product, such as, for example, SBR Rubber latex. The cathode can include an optional electric-conductivity promoter, such as, for example, graphite-derived small particles, graphene, carbon nano-tubes, carbon nano-sheet, carbon blacks, etc. Finally, the cathode can include an electric charge collector such as, for example, an aluminum foil, a copper foil, a carbon foil, a carbon fabric, or other metallic foil.

The method of making the cathode can include coating an immobilized selenium-containing slurry onto the charge collector, followed by drying the slurry coated charge collector (e.g., air dry, oven-dry, vacuum oven-dry, etc.). The immobilized selenium can be dispersed into the slurry, which can be prepared by a high shear mixer, a regular mixer, a planetary mixer, a double-planetary mixer, a ball mill, a vertical attritor, a horizontal mill, etc. The slurry can then be coated onto the charge collector, followed by drying in room air or in a vacuum. The coated cathode can then be pressed or roller-milled (or calendared) prior to its use in a rechargeable battery.

A rechargeable battery can be made using the above-described composite. The rechargeable battery can be charged at 0.1C, 0.2C, 0.5C, 1C, 1.5 C, 2C, 3C, 4C, 5C, 6C, 7C, 8C, 9C, 10C or faster.

Example 13: Preparation of Immobilized Selenium Doped with Sulfur, Electrode, and Batteries Thereof Following the principles and procedures described in Example 10, 5 atomic percent (at %) of selenium, 20 at % of selenium, 35 at % of selenium, and 50 at % of selenium were separately replaced by sulfur in the synthesis of immobilized sulfur-doped selenium detailed in the following Table 4. Samples of the sulfur-doped immobilized selenium were synthesized with the carbon skeleton prepared in accordance with the principles and procedures described Example 9.

TABLE 4

| Sample ID | Se, at % | S, at % | Se, wt % | S, wt % |
|---|---|---|---|---|
| Se95S5 | 95 | 5 | 97.9 | 2.1 |
| Se80S20 | 80 | 20 | 90.8 | 9.2 |
| Se65S35 | 65 | 35 | 82.1 | 17.9 |
| Se50S50 | 50 | 50 | 71.1 | 28.9 |

The thus prepared samples of immobilized sulfur-doped selenium were then used to prepare a number of cathodes 4 comprising immobilized sulfur-doped selenium in accordance with the principles and procedures described in Example 11 for immobilized selenium.

The thus prepared cathodes comprising immobilized sulfur-doped selenium in this example were then used to prepare coin cell batteries in accordance with the principles and procedures described in Example 12.

The assembled coin cell batteries in this example were then tested in the battery tester described in Example 12, following the same testing protocols also described in Example 12, at 0.1C and 1C charging and discharging cycling rates.

Figure 18:
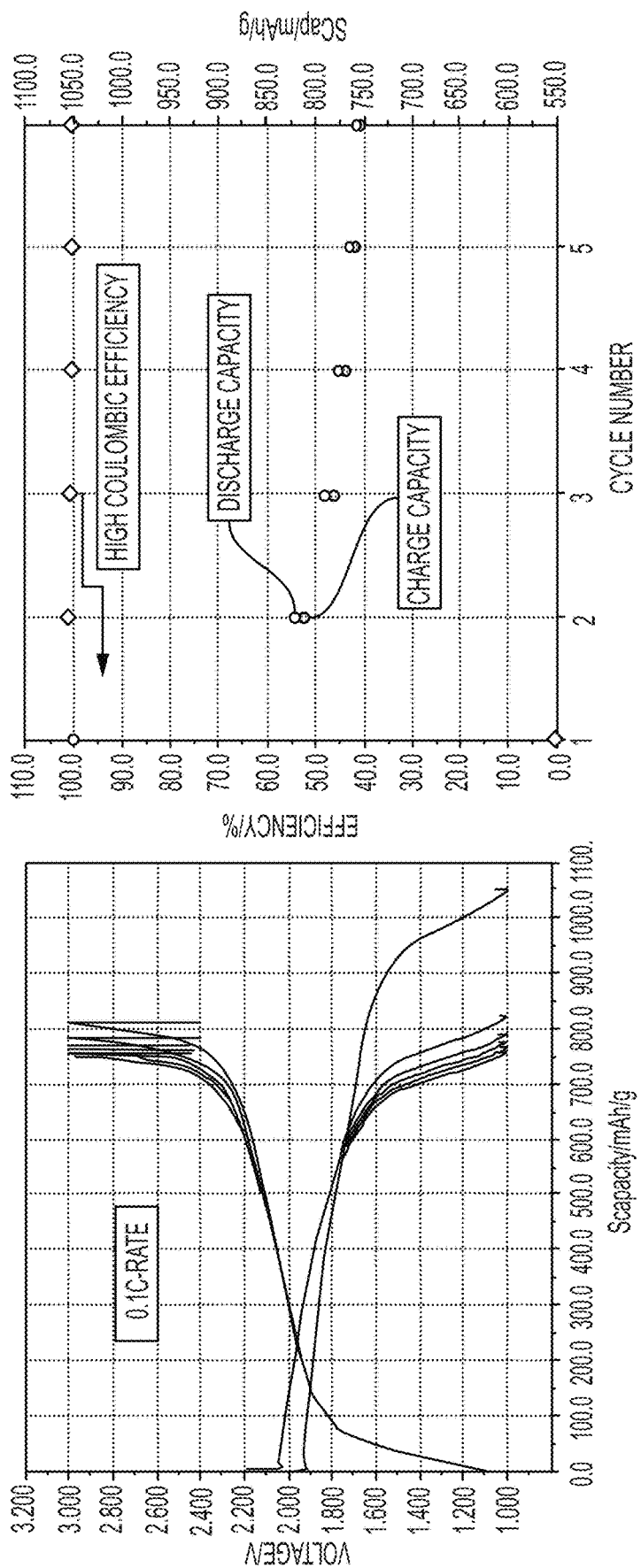
FIG. 18 are graphs of 0.1C cycling test results for a lithium-sulfur-doped-selenium coin cell battery of the type shown in FIG. 15 made in accordance with Example 13 with a polymer separator.

The electrochemical cycling results at 0.1C for coin cell batteries including a cathode comprised of immobilized sulfur-doped selenium cathode made with immobilized sulfur-doped selenium sample (Se50S50 in Table 4) are shown in FIG. 18, having a $2^{nd}$ cycle discharge capacity of 821 mAh/g (which is considered good) and a steady Coulombic efficiency ≥95%, typically ≥98% (which is also considered good), or as high as 100%.

If selenium is assumed to have a stoichiometric specific capacity of 675 mAh/g at the 0.1C cycling rate, then sulfur specific capacity would be estimated to be about 1,178 mAh/g (which is considered good for sulfur). The Coulombic efficiency ≥95%, ≥98%, or as high as 100% indicates that there is no significant amount of sulfur being shuttled between the cathode and anode. Sulfur species in the immobilized sulfur-doped selenium battery function well in an electrolyte comprising carbonate. Typically, sulfur would not be expected to function well in a Li—S battery having carbonate as the electrolyte; a conventional Li—S battery typically uses an ether-based electrolyte. Carbonate-based electrolyte is typically used in present lithium-ion batteries. Carbonate-based electrolyte is more economical and much more widely available in the market place, as compared to ether-based electrolyte.

Figure 19:
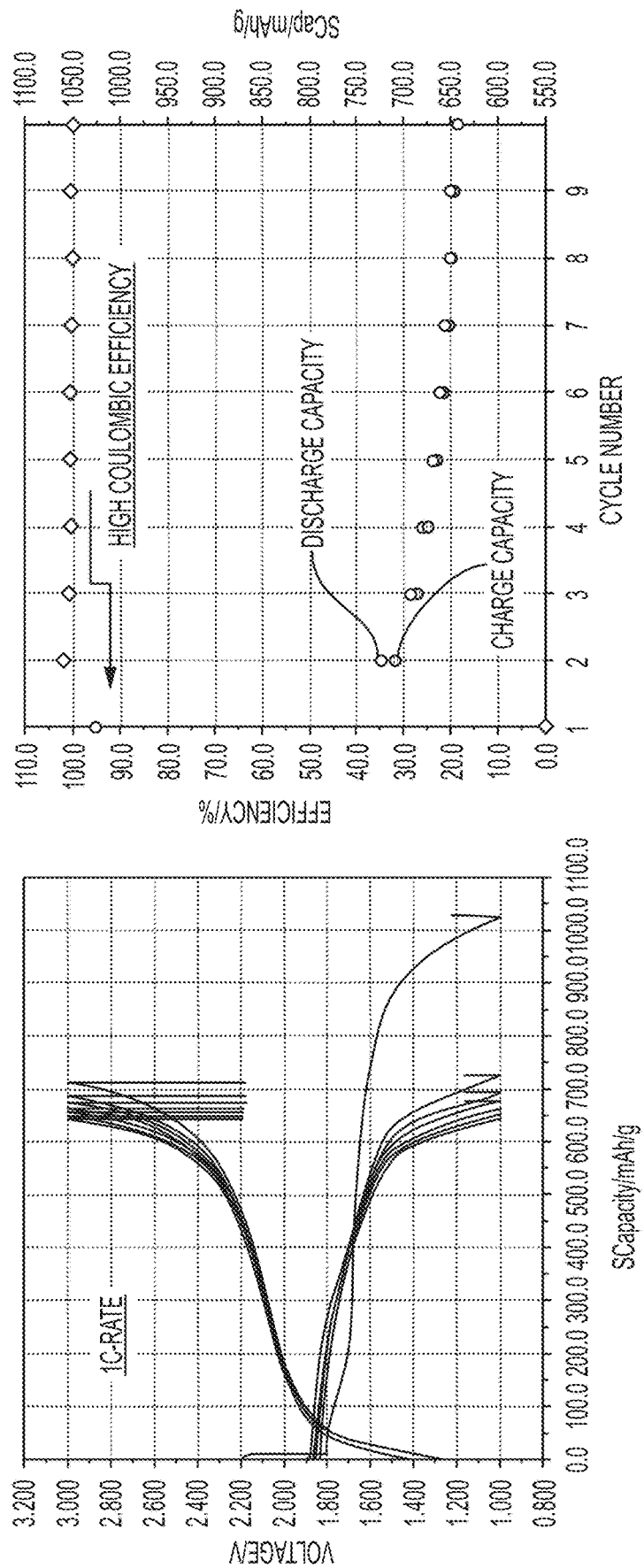
FIG. 19 are graphs of 1C cycling test results for a lithium-sulfur-doped-selenium coin cell battery of the type shown in FIG. 15 made in accordance with Example 13 with a polymer separator.

The electrochemical cycling results at the 1C cycling rate for coil cell batteries including a cathode comprised of immobilized sulfur-doped selenium cathode made with immobilized sulfur-doped selenium sample (Se50S50 in Table 4) are shown in FIG. 19, having a $2^{nd}$ cycle discharge capacity of 724 mAh/g and a steady Coulombic efficiency ≥95%, typically ≥98%, or as high as 100%.

If selenium is assumed to have a specific capacity of 625 mAh/g at the 1C cycling rate, then the sulfur specific capacity would be estimated to be about 966 mAh/g (which is also unexpected). Sulfur is an insulator and has a very low electrical conductivity. Typically, a Li—S battery cannot cycle well at a fast cycling rate, such as at 1C rate.

As can be seen, when used as a cathode material in a rechargeable battery, immobilized sulfur-doped selenium overcomes two fundamental issues associated with Li—S batteries, namely, shuttling effect and low cycling rate. With these two issues resolved, a battery including a cathode comprised of immobilized sulfur-doped selenium can have high energy density and high power density in real applications.

As can be seen, in an example, an immobilized sulfur-doped selenium system or body can be formed by the method comprising: (a) mixing selenium, carbon, and sulfur to form a selenium-carbon-sulfur mixture; (b) heating the mixture of step (a) to a temperature above the melting temperature of selenium; and (c) causing the heated mixture of step (b) to cool to ambient or room temperature, thereby forming the immobilized sulfur-doped selenium body.

The immobilized sulfur-doped selenium body of step (c) can comprise selenium and sulfur in a carbon skeleton body.

Step (a) can occur under a dry or a wet condition.

Step (b) can include homogenizing or blending the mixture.

Step (a) can include forming the selenium-carbon-sulfur mixture into a body. Step (b) can include heating the body to a temperature above the melting temperature of selenium. Step (c) can include causing or allowing the body to cool to ambient or room temperature.

Step (b) can include heating the mixture for a sufficient time for the selenium and carbon and sulfur to fully or partially react.

In another example, a method of preparing an immobilized sulfur-doped selenium system or body can comprise: (a) forming a carbon skeleton; and (b) melting selenium and sulfur into the carbon skeleton.

In another example, a method of forming an immobilized sulfur-doped selenium system or body can comprise: (a) mixing selenium and carbon and sulfur; and (b) following step (a), causing the selenium and sulfur to dissolve onto the carbon thereby forming the immobilized sulfur-doped selenium system or body.

A solvent for dissolving the selenium and sulfur can be an alcohol, an ether, an ester, a ketone, a hydrocarbon, a halogenated hydrocarbon, a nitrogen-containing compound, a phosphorus containing compound, a sulfur-containing compound, or water. The solvent can be added to one or more of the selenium, the sulfur, or the carbon prior to step (a), during step (a), or during step (b).

The method can further including (c) removing excess non-immobilized selenium, non-immobilized sulfur, or both from the immobilized sulfur-doped selenium system or body.

Also disclosed is a rechargeable battery comprising: a cathode comprised of immobilized sulfur-doped selenium disposed on an electrically conductive substrate; a separator disposed in direct contact with the electrically conductive substrate, and in contact with the immobilized sulfur-doped selenium; and an anode spaced from the cathode by the separator.

The rechargeable battery can further include the anode spaced from the separator by lithium. In an example, the lithium can be in the form of a lithium foil.

The rechargeable battery can further include the cathode, the separator, the anode, and the lithium immersed in an electrolyte.

In the rechargeable battery the immobilized sulfur-doped selenium can comprise a selenium-carbon-sulfur mixture, wherein the selenium and sulfur has been melted into the carbon.

In the rechargeable battery the separator can be formed from an organic material, an inorganic material, or a solid electrolyte.

The rechargeable battery can have a Coulombic efficiency ≥95%.

The examples have been described with reference to the accompanying figures. Modifications and alterations will occur to others upon reading and understanding the foregoing examples. Accordingly, the foregoing examples are not to be construed as limiting the disclosure.

The invention claimed is:

1. A rechargeable battery comprising:
a cathode comprised of immobilized selenium disposed on an electrically conductive substrate;
a separator disposed in direct contact with the immobilized selenium; and
an anode,
wherein
the separator is formed from an organic material, an inorganic material, or a solid electrolyte; and
the immobilized selenium comprises a selenium-carbon mixture, wherein the selenium has been melted into the carbon, thereby forming an immobilized selenium system or body comprising selenium in a carbon skeleton body, wherein an activation energy for a selenium particle to escape the immobilized selenium system or body is ≥95 kJ/mole, and wherein the immobilized selenium system or body has a mid-point weight-loss temperature ≥520° C.

2. A rechargeable battery comprising:
a cathode comprised of immobilized selenium disposed on an electrically conductive substrate, the immobilized selenium exhibiting a mid-point weight-loss temperature ≥520° C.;

a separator disposed in direct contact with the immobilized selenium; and
an anode,
wherein the separator is formed from an organic material, an inorganic material, or a solid electrolyte.

3. The rechargeable battery of claim 2, wherein the rechargeable battery exhibits at least one of the following:
an electrochemical capacity of ≥400 mAh/g;
a specific capacity of >30% of a second discharge capacity at a charge-discharge cycling rate of 0.1 C following charge-discharge cycling at 5 cycles at 10 C; and
a Coulombic efficiency ≥50%.

4. The rechargeable battery of claim 2, wherein the anode is spaced from the separator by lithium.

5. The rechargeable battery of claim 4, wherein the cathode, the separator, the anode, and the lithium are immersed in an electrolyte.

* * * * *